United States Patent
Shimamura

(10) Patent No.: US 11,281,644 B2
(45) Date of Patent: Mar. 22, 2022

(54) BLOCKCHAIN LOGGING OF DATA FROM MULTIPLE SYSTEMS

(71) Applicant: Hitachi, Ltd., Tokyo (JP)

(72) Inventor: Atsushi Shimamura, Sunnyvale, CA (US)

(73) Assignee: HITACHI, LTD., Tokyo (JP)

( * ) Notice: Subject to any disclaimer, the term of this patent is extended or adjusted under 35 U.S.C. 154(b) by 609 days.

(21) Appl. No.: 15/662,317

(22) Filed: Jul. 28, 2017

(65) Prior Publication Data

US 2019/0034465 A1   Jan. 31, 2019

(51) Int. Cl.

| | |
|---|---|
| G06F 16/22 | (2019.01) |
| G06F 16/2458 | (2019.01) |
| G06F 16/23 | (2019.01) |
| G06Q 20/38 | (2012.01) |
| G06Q 20/00 | (2012.01) |
| H04L 9/32 | (2006.01) |
| G06Q 20/02 | (2012.01) |

(52) U.S. Cl.
CPC .......... *G06F 16/2228* (2019.01); *G06F 16/23* (2019.01); *G06F 16/2474* (2019.01); *G06Q 20/00* (2013.01); *G06Q 20/02* (2013.01); *G06Q 20/3827* (2013.01); *H04L 9/3239* (2013.01); *H04L 2209/38* (2013.01)

(58) Field of Classification Search
CPC .. G06F 16/2228; G06F 16/2474; G06F 16/23; H04L 9/3239; H04L 2209/38; G06Q 20/3827; G06Q 20/02; G06Q 20/00
See application file for complete search history.

(56) References Cited

U.S. PATENT DOCUMENTS

| | | | |
|---|---|---|---|
| 2017/0337534 A1* | 11/2017 | Goeringer | H04L 9/3239 |
| 2018/0294956 A1* | 10/2018 | O'Brien | G06F 11/1464 |
| 2019/0013933 A1* | 1/2019 | Mercuri | G06F 21/602 |

OTHER PUBLICATIONS

Diego Ongaro, et al., "In Search of an Understandable Consensus Algorithm", Extended Version of 32, May 20, 2014.

* cited by examiner

*Primary Examiner* — Kristopher Andersen
*Assistant Examiner* — James E Heffern
(74) *Attorney, Agent, or Firm* — Mattingly & Malur, PC

(57) ABSTRACT

In some examples, a first node is able to communicate with one or more second nodes for participating in a consensus system. The first node may receive a plurality of pieces of sequential data from a plurality of data sources. The first node may generate a block for a first blockchain that includes a plurality of the pieces of sequential data in the block. Based at least partially on determining that the data source of the last piece of sequential data entered in the block for the first blockchain is different from a data source of the next piece of the sequential data, the first node may generate a block for a second blockchain that includes the next piece of the sequential data, and may further associate an indicator with the block generated for the second blockchain that indicates the block in the first blockchain.

17 Claims, 14 Drawing Sheets

| Source ID | Leader Time | Source Local Time | Content | Blockchain and Block |
|---|---|---|---|---|
| A | 9/1 14:53:18 | 14:53:20 | Buy 25 units of X at $2.45 | Thread ID: 1, Block: 1 |
| B | 9/1 14:53:19 | 14:53:37 | Buy 10 units of X at $2.46 | Thread ID: 1, Block: 1 |
| B | 9/1 14:53:20 | 14:53:38 | Buy 8 units of X at $2.47 | Thread ID: 1, Block: 1 |
| D | 9/1 14:53:22 | 14:54:10 | Sell 20 units of Y at $12.85 | Thread ID: 1, Block: 1 |
| D | 9/1 14:53:25 | 14:54:11 | Sell 25 units of X at $2.45 | Thread ID: 1, Block: 1 |
| D | 9/1 14:53:26 | 14:54:12 | Sell 2 units of X at $2.46 | Thread ID: 2, Block: 1 |
| C | 9/1 14:53:27 | 14:53:21 | Buy 20 units of Y at $12.83 | Thread ID: 2, Block: 1 |
| A | 9/1 14:53:28 | 14:53:30 | Buy 10 units of X at $2.48 | Thread ID: 2, Block: 1 |
| B | 9/1 14:53:29 | 14:53:47 | Sell 10 units of X at $2.49 | Thread ID: 2, Block: 1 |
| D | 9/1 14:53:30 | 14:54:15 | Buy 25 units of Y at $12.75 | Thread ID: 2, Block: 1 |
| B | 9/1 14:53:32 | 14:53:50 | Buy 15 units of X at $2.45 | Thread ID: 2, Block: 1<br>Thread ID: 3, Block: 1 |
| C | 9/1 14:53:33 | 14:53:25 | Buy 20 units of X at $2.46 | Thread ID: 3, Block: 1 |
| D | 9/1 14:53:36 | 14:54:22 | Sell 15 units of X at $2.48 | Thread ID: 3, Block: 1 |
| D | 9/1 14:53:37 | 14:53:39 | Buy 30 units of X at $2.47 | Thread ID: 3, Block: 1 |
| A | 9/1 14:53:38 | 14:53:30 | Buy 10 units of Y at $12.85 | Thread ID: 3, Block: 1 |
| C | 9/1 14:53:40 | 14:53:41 | Sell 25 units of Z at $5.27 | Thread ID: 3, Block: 1<br>Thread ID: 1, Block: 2 |
| A | 9/1 14:53:41 | 14:54:27 | Buy 10 units of X at $2.46 | Thread ID: 1, Block: 2 |
| D | 9/1 14:53:42 | 14:53:34 | Sell 20 units of Y at $12.69 | Thread ID: 1, Block: 2 |
| C | 9/1 14:53:43 | 14:54:00 | Sell 10 units of Y at $12.67 | Thread ID: 1, Block: 2 |
| B | 9/1 14:53:44 | 14:54:01 | Buy 20 units of X at $2.46 | Thread ID: 1, Block: 2 |

FIG. 13

BLOCKCHAIN LOGGING OF DATA FROM MULTIPLE SYSTEMS

BACKGROUND

A blockchain is a type of distributed database that maintains a continuously growing series (i.e., a chain) of records called blocks. Each block contains a timestamp and a link to a previous block. The blocks may store transactions or other types of information. The verification process for a block may be performed fairly simply, which reduces the possibility of fraudulent transactions. By storing data distributed in multiple locations across a network, the blockchain reduces or eliminates the risks that come with data being held centrally.

Further, blockchain technology can make it very difficult to alter retroactively any single block of the chain. For example, the database is distributed (i.e., stored on a plurality of different computers concurrently) so all users with access to any one computer in the distributed database may be notified immediately of new additions to the blockchain.

In some cases, data received in a sequence may be recorded using a blockchain. Further, it may be desired for the order of the sequence to be recorded accurately in case the order of the sequence needs to be verified later. In a conventional blockchain consensus system, there may be a system latency that can delay the recording of the data in the blockchain, which can cause a backlog or other issues if the data is received frequently.

SUMMARY

Some examples herein include a plurality of computing nodes configured as a plurality of consensus nodes participating in a consensus system. As one example, a first computing node able to communicate with one or more second computing nodes for participating in the consensus system, may receive a plurality of pieces of sequential data from a plurality of data sources. The first node may generate a block for a first blockchain such that the block for a first blockchain includes a plurality of the pieces of sequential data. The first node may determine whether a data source of a last piece of sequential data entered in the block for the first blockchain matches a data source of a next piece of the sequential data. Based at least partially on determining that the data source of the last piece of sequential data entered in the block for the first blockchain is different from a data source of the next piece of the sequential data, the first node may generate a block for a second blockchain that includes the next piece of the sequential data. Further, the first node may associate an indicator with the block generated for the second blockchain that indicates the block in the first blockchain.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 13 illustrates an example data structure of a block list that may be output by the auditing computing device according to some implementations.

DESCRIPTION OF THE EMBODIMENTS

Figure 1:
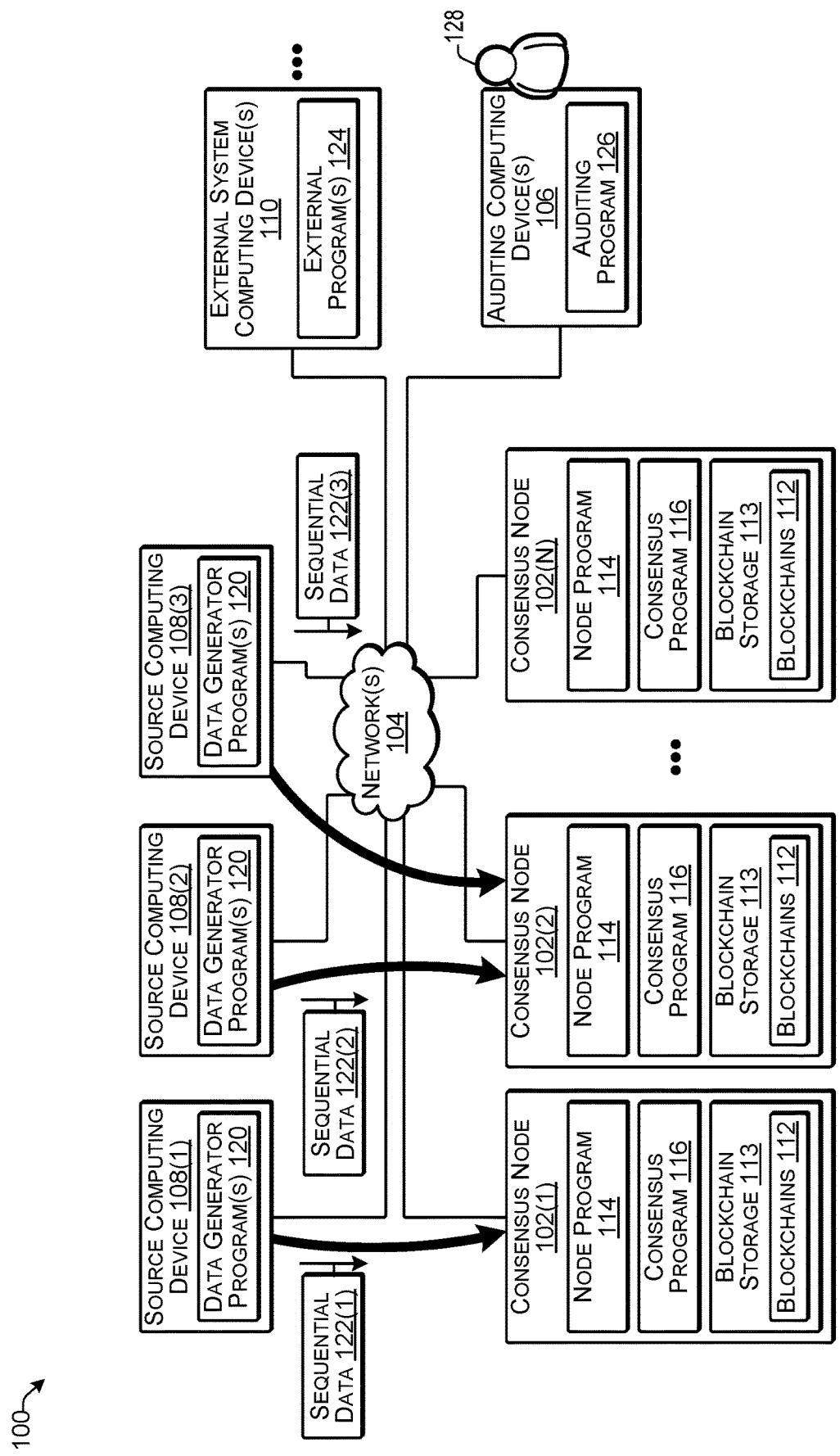
FIG. 1 illustrates an example architecture of a system for blockchain logging of data according to some implementations.

Some implementations herein are directed to techniques and arrangements for using blockchains to store sequential data. As several examples, the sequential data may include a series of events, a series of messages, a series of log entries, or the like, that are associated with a timing. Some examples herein apply in the environment of blockchain systems that include a plurality of consensus node computing devices (hereinafter "consensus nodes"). The consensus nodes may be configured to add, to the blockchain, the sequential data based on a timing sequence indicated by the source of the data, rather than a time determined at or by any one of the consensus nodes. As each new block is generated, a consensus on the block is decided among the consensus nodes before the block is added to a corresponding blockchain. When the sequential data is being received at a high rate, to avoid a backlog of the sequential data, two or more blockchains may be generated concurrently to enable one or more blocks to be generated while a consensus is being determined for one or more previously generated blocks.

In some examples, an order of the blocks and/or the data contained within different blocks in different blockchains may be determined by using at least a portion of the last data from a last block as the first data of a next block. As one example, a full duplicate of the last data entered as a last entry in a block in one blockchain may be used as a first entry in the data in a new block in another blockchain. As another example, the data might only be partially duplicated in the new block, such as by only including a portion of the data from the last entry in the last block. For instance, just a source identifier (ID) (e.g., indicating the source computing device or other type of source of the data) and the source local time provided by the sender might be duplicated, while the data content and other portions of the data might not be included in the duplicated data. This alternative may be useful in the case that the data content is large. Further, in other examples, rather than duplicating the data, another type of indicator, or the like, may be used in place of duplicating the data of the last entry. For example, the indicator may include identifying information about the preceding block in the other blockchain, such as a block ID and a blockchain ID, thread ID, or the like.

By generating a plurality of blockchains concurrently, implementations herein are able to record a sequence of data on the plurality of blockchains more quickly than would be the case if only a single blockchain were to be used. For example, the consensus system herein employs communication among the multiple consensus nodes for reaching a consensus. Latency in the network between the consensus nodes and/or the consensus nodes themselves may cause the creation of a single blockchain to be too slow to record a large amount of sequential data that might be received in some types of applications. Accordingly, examples herein are able to improve the throughput in the consensus nodes by employing multiple blockchains concurrently for recording the received sequential data into the multiple blockchains thereby improving the operation of the consensus nodes and the consensus system. For instance, by generating multiple blockchains concurrently, the backlog in a storage buffer that receives the sequential data can be managed or otherwise controlled by controlling the number of blockchains being generated concurrently for recording the received sequential data.

Furthermore, in some examples, a sequence already defined by the source(s) of the sequential data may be used when recording the sequence of the data received. For example, a local time associated with the data by the data source may be used along with a data source ID for determining a next block among multiple blocks in multiple blockchains. Furthermore, by using the consensus among the consensus nodes in the system and a plurality of blockchains, the consensus order sequence can be recorded and may later be verified by other entities.

By using multiple consensuses and multiple blockchains, implementations herein increase the total throughput of the sequential data. In some examples, obtaining the multiple consensuses includes the use of a leader consensus node, which builds or otherwise generates a new block for consensus using a portion of the received sequential data. The leader consensus node may then distribute the new block or at least information about the new block to the other consensus nodes for obtaining a consensus on the new block. Furthermore, the leader consensus node may distribute or otherwise include order information in multiple consensus processes. To achieve rebuilding the full sequence later, leader node establishes sequences are settled by consensus to each block. When the consensus is reached for a particular block, the leader consensus node and each of the other consensus nodes may record that block to its corresponding blockchain. Accordingly, each of the consensus nodes may be concurrently executing multiple blockchain threads for generating multiple blockchains from the received sequential data.

In some examples, an auditing computing device may communicate with one or more of the consensus nodes to obtain the multiple blockchains for conducting an audit of the information included in the multiple blockchain. For example, the auditing computing device may read or otherwise access the blockchains maintained by one or more of the consensus nodes and may serialize the data contained in the blockchains. For example, the auditing computing device may initialize a block list for serialize block data. In some cases, the block list may store block data in a serialized order. To create the block list, the auditing computing device may add the information from each block in each blockchain to the block list and may establish the location in the block list of the sequential data based on the order of the blocks in the blockchains as well as the source IDs and the local date and time associated with each piece of the sequential data. The auditing computing device may output the block list and/or an analysis of the block list such as to an auditor, user, client, or other destination.

For discussion purposes, some example implementations are described in the environment of blockchains used in connection with certain types of data such as system log entries, securities transactions, or the like. However, implementations herein are not limited to the particular examples provided, and may be extended to other blockchain applications, other types of data, other types of computing systems, other system architectures, and so forth, as will be apparent to those of skill in the art in light of the disclosure herein.

FIG. 1 illustrates an example architecture of a system 100 for blockchain logging of data according to some implementations. The system 100 includes a plurality of consensus node computing devices 102(1), 102(2), . . . , 102(N), referred to hereinafter as consensus nodes 102, that are able to communicate with each other over one or more networks 104. Additionally, the consensus nodes 102 are able to communicate through the one or more networks 104 with one or more auditing computing devices 106, source computing devices 108(1), 108(2), and 108(3), and/or one or more external system computing devices 110.

In some examples herein, the system 100 is a scalable, decentralized peer-to-peer system able to generate and maintain blockchains 112 in a blockchain storage 113. Thus, the integrity of the data maintained in the blockchains 112 is based on a consensus mechanism rather than, e.g., a mere trust-based infrastructure. In examples herein, "consensus" may refer to a collective decision-making process or agreement as to what is true or false. For instance, the system 100 provides a distributed consensus network made up of the participating consensus nodes 102 in which the various different consensus nodes 102 participating in the system 100 may come to an agreement. In some cases, individual consensus nodes 102 may contribute their own data to enable the consensus network as a whole to achieve a collective agreed-upon decision.

The system 100 may include one or more of the source computing devices 108, one or more of which may include one or more data generator programs 120 that generate the sequential data 122. For example, suppose in this example that the first source computing device 108(1) generates sequential data 122(1) that it sends to the first consensus node 102(1), the second source computing device 108(2) generates sequential data 122(2) that it sends to the second consensus node 102(2), and the third source computing device 108(3) generates sequential data 122(3) that it sends also to the second consensus node 102. Furthermore, while three source computing devices 108 are shown in this example, in other examples more or fewer source computing devices 108 may be employed. Additionally, in some cases, the source computing devices may send the sequential data 122 to all of the consensus nodes 102 or to others of the consensus nodes 102, and so forth. In addition, in some examples, the consensus nodes 102, upon receiving the sequential data 122, may share the sequential data 122 with the other consensus nodes 102 in the consensus system 100.

The system 100 is configured to record the chronological or otherwise sequential order of events, transactions, log entries, messages, or other types of sequential data 122 as successive blocks in the blockchains 112, which serve as a distributed database for the corresponding sequential data. As a result, the sequential data 122 is securely recorded in the blockchains and is practically unalterable. All the consensus nodes 102 in the system 100 may execute the same node program 114 and same consensus program 116 for the same sequential data.

In some examples herein, one of the consensus nodes 102 may act a leader consensus node for the consensus system. In this example, suppose that consensus node 102(1) is the leader consensus node. The leader consensus node may be selected using any desired technique such as random selection, round robin selection, designation by a system administrator, or the like. The leader consensus node may build or otherwise generate a new block using a portion of the received sequential data 122. The leader consensus node may then distribute the new block or at least information about the new block to the other consensus nodes for obtaining a consensus on the new block. Furthermore, the leader consensus node may distribute or otherwise include order information in multiple consensus processes or threads. To achieve rebuilding the full sequence later, the leader consensus node may establish sequences for are settled by consensus for each block. When a consensus is reached for a particular block, the leader consensus node and each of the other consensus nodes may record that block to the blockchain to which the block corresponds. Accordingly, in some cases, each of the consensus nodes 102 may maintain a complete copy of each blockchain 112 of a plurality of blockchains 112.

In examples herein, consensus includes a process of agreeing on one result among the group of consensus nodes 102(1)-102(N). There are several techniques of determining agreement, such as Practical Byzantine Fault Tolerance (PBFT), Paxos Consensus Protocols, and the Raft Consensus Algorithm. For example, PBFT generally relies on receiving a sufficient number of responses that are identical for reaching agreement that a transaction is valid. Additionally, in a Paxos consensus system, a coordinator may suggest a value to all nodes and gathers the nodes responses as to whether the nodes agree with the value or not. If all nodes agree (or a sufficient number agree in some examples), the value is accepted and the coordinator contacts all nodes to let them know that the value is final. As another example, similar to Paxos, the Raft algorithm achieves consensus via an elected leader. For instance, a server in a raft cluster is either the leader or a follower. The leader accepts data for consensus forwards the data to the followers. After the leader receives agreement from the majority of the followers, the request is considered committed. Further, while several example techniques for reaching consensus are discussed herein, other possible techniques will be apparent to those of skill in the art having the benefit of the disclosure herein.

In some examples, the decentralized peer-to-peer nature of the system 100 herein may help prevent any single user or group of users from controlling the underlying infrastructure or undermining the integrity of the system 100. For instance, the users may be individuals, corporations, state actors, organizations, and so forth, or a combination of any these entities. In some examples herein, the system 100 may be private (i.e., not generally accessible to the public) and the consensus nodes 102 may typically be owned by, operated by, or otherwise associated with one or more of the users. In other cases, some or all of the consensus nodes 102 may be associated with a third party who provides the consensus system as a service. Numerous other variations will be apparent to those of skill in the art having the benefit of the disclosure herein.

The consensus nodes 102 may each maintain a copy of the blockchains 112 and may participate in validating the sequence of the received sequential data and corresponding blocks of the blockchains 112. In some cases, the source computing devices 108 may be used for executing one or more smart contracts as part of the data generator program 120 for a variety of different applications, such as for performing security transactions, logging events in a system, managing internet of things (IoT) devices, managing data, tracking banking transactions, or any of numerous other applications.

The external system computing device 110 may include one or more external programs 124. In some cases, the external program(s) 124 may receive the sequential data 122 from the consensus nodes 102 and/or from the source computing devices 108, and may perform one or more actions based on the sequential data 122. As one example, the external system computing device(s) 110 may be a securities exchange server, or the like, and the sequential data may be a plurality of buy and sell orders for securities. In securities trading, the securities exchange server may execute trades in the sequence of the order received by the securities exchange server. For instance, the source computing devices 108 may be controlled by a securities firm, investment banking firm, etc. The firm may receive orders for trading securities from computing devices of the securities firm's customers or the firm's own internal traders. In response, the source computing devices 108 may send the orders to one or more of the consensus nodes 102. In some examples, the consensus node may forward the orders to the securities exchange server (external computing device 110 in this example), while in other examples, the source computing devices 108 may forward the orders to both the consensus node and the security exchange server concurrently.

The securities exchange server may have its own system (not shown) to record the sequence of orders to verify later. However, if orders are only recorded by the securities exchange server, it may be difficult to check for a defect or fraud in the securities exchange server. On the other hand, by using blockchains and by reaching a consensus among consensus nodes, as described herein, a consented order sequence can be recorded and verified by other entities. Alternatively, in other examples, the securities exchange server may use the consensus system 100 for recording received buy/sell orders.

As another example, the external system computing device(s) 110 may be one or more bank servers and the sequential data 122 may be banking transactions from multiple locations. As still another example, the external system computing device 110 may be a management computer and the sequential data 122 may include a sequence of logs from multiple subsystems. In still other examples, the external system computing device(s) 110 are not included. Numerous other applications and variations will be apparent to those of skill in the art having the benefit of the disclosure herein.

In addition, the auditing computing device(s) 106 may execute an auditing program 126. For example, the auditing program 126 may be executed periodically, at the request or instruction of a user or an auditor 128, or based on some other trigger. The auditing program 126 may configure the auditing computing device 106 to read or otherwise access the blockchains 112 maintained by one or more of the consensus nodes 102 and may serialize the data contained in the blockchains. For example, the auditing program 126 may initialize a block list (not shown in FIG. 1) for serializing the block data. In some cases, the block list may store block data in a serialized order. To create the block list, the auditing program 126 may add the information from each block in each blockchain 112 to the block list and may establish the location in the block list of the sequential data 122 based on the order of the blocks in the blockchains 112, as well as based on the source IDs and the local date and time associated with each piece of the sequential data 122. The auditing program 126 may output the block list and/or an analysis of the block list such as to the auditor 128 and/or to a user, client, or other destination. Further, while the auditing computing device 106 is illustrated as being a separate computing device in this example, in other examples, the auditing computing device 106 may be combined with a consensus node 102 such that one or more of the consensus nodes 102 may also perform the functions of the auditing computing device 106.

Figure 2:
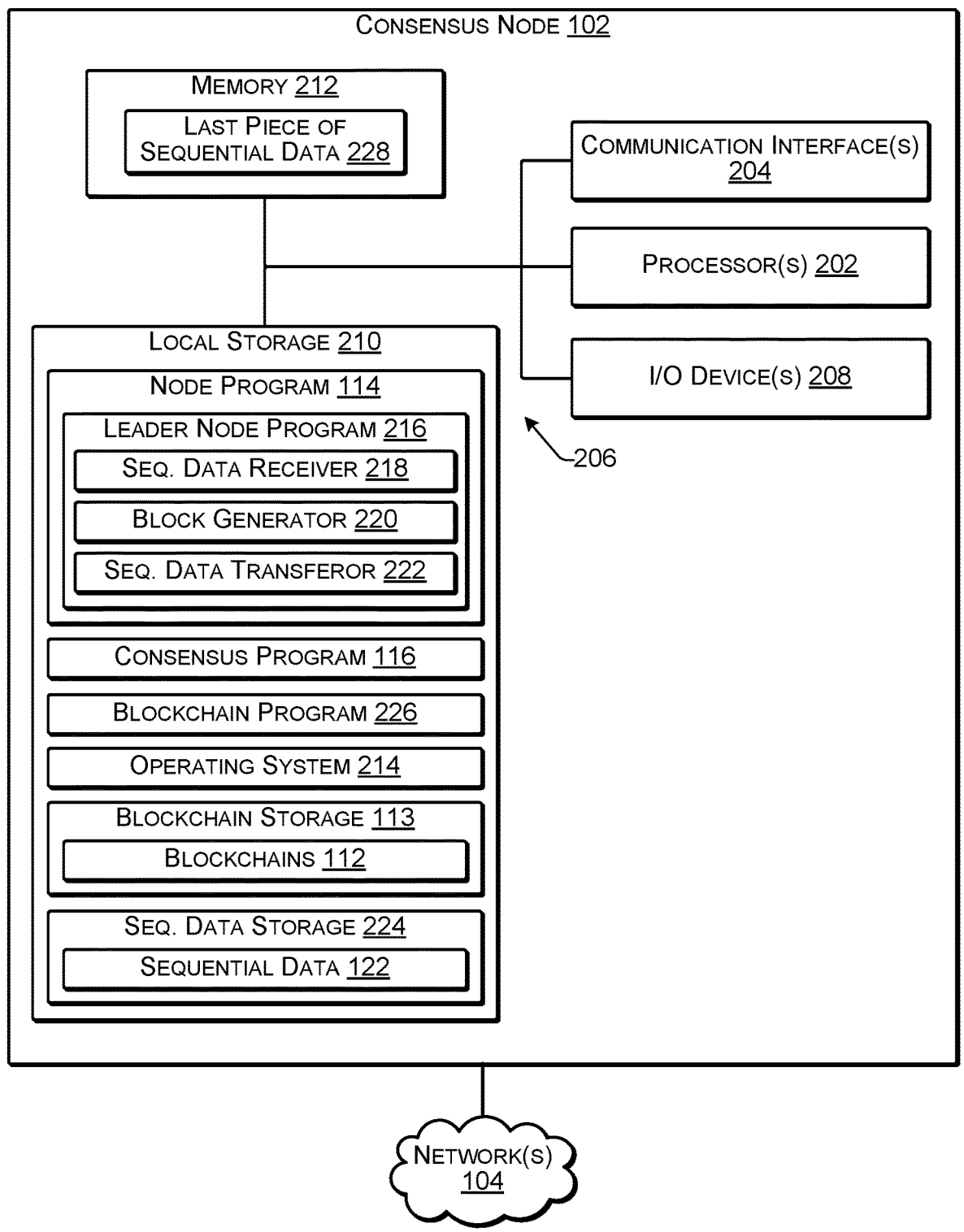
FIG. 2 illustrates an example of a consensus node according to some implementations.

FIG. 2 illustrates an example of a consensus node 102 according to some implementations. In some cases, the consensus nodes 102 may include a plurality of physical servers or other types of computing devices that may be embodied in any of a number of ways. For instance, in the case of a server, the modules, programs, other functional components, and a portion of data storage may be implemented on the servers, e.g., at one or more server farms or data centers, cloud-hosted computing services, and so forth, although other computer architectures may additionally or alternatively be used.

In the illustrated example, the consensus node 102 includes, or may have associated therewith, one or more processors 202, one or more communication interfaces 204, one or more computer-readable media 206, and one or more input/output (I/O) devices 208. For example, the computer-readable media may include a local storage 210 and a memory 212. Further, while a description of one consensus node 102 is provided, the other consensus nodes 102 may have the same or similar hardware and software configurations and components. Additionally, the auditing computing device(s) 106, the source computing device(s) 108, and the external system computing device(s) 110 may have similar hardware configurations with different programs, software, and other functional components thereon.

Each processor 202 may be a single processing unit or a number of processing units, and may include single or multiple computing units, or multiple processing cores. The processor(s) 202 can be implemented as one or more central processing units, microprocessors, microcomputers, microcontrollers, digital signal processors, state machines, logic circuitries, graphics processors, and/or any devices that manipulate signals based on operational instructions. For instance, the processor(s) 202 may be one or more hardware processors and/or logic circuits of any suitable type specifically programmed or configured to execute the algorithms and processes described herein. The processor(s) 202 can be configured to fetch and execute computer-readable instructions stored in the computer-readable media 206, which program the processor(s) 202 to perform the functions described herein.

The computer-readable media 206 may include volatile and nonvolatile memory and/or removable and non-removable media implemented in any type of technology for storage of information such as computer-readable instructions, data structures, program code, or other data. For example, the computer-readable media 206 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the consensus node 102, the computer-readable media 206 may be a tangible non-transitory medium to the extent that, when mentioned, non-transitory computer-readable media exclude media such as energy, carrier signals, electromagnetic waves, and/or signals per se. In some cases, the computer-readable media 206 may be at the same location as the consensus node 102, while in other examples, the computer-readable media 206 may be separate or partially remote from the consensus node 102.

The computer-readable media 206 may be used to store any number of functional components that are executable by the processor(s) 202. In many implementations, these functional components comprise instructions, modules, or programs that are executable by the processor(s) 202 and that, when executed, specifically program the processor(s) 202 to perform the actions attributed herein to the consensus node 102. Functional components stored in the computer-readable media 206 may include the node program 114 and the consensus program 116. In some examples, the node program 114 may include a leader node program 216. As mentioned above, in some cases, one of the consensus nodes may act as a leader consensus node while the other consensus nodes may be follower consensus nodes. Accordingly, the leader consensus node may execute the leader node program 216, which may include a sequential data receiver 218, a block generator 220, and a sequential data transferor 222, each of which may be executable instructions executable by the processor 202 for performing the functions described herein.

For example, the sequential data receiver 218 may configure the processor 202 to receive the sequential data 122 from the source computing devices 108 and/or the other consensus nodes, and store the received sequential data 122 in a sequential data storage 224. For instance, the sequential data storage 224 may be a storage buffer or the like, such as configured as a first-in-first-out (FIFO) queue in which the sequential data 122 is stored until it can be recorded on a blockchain 112. Furthermore, the block generator 118 may be used by the leader node program 216 for generating a new block for a blockchain as described additionally below. In addition, the sequential data transferor 222 may send the sequential data 122 to another device, such as the external system computing device 110. For instance, the sequential data may be sent first to the consensus system to ensure that the sequential data is recorded, and then the consensus system may for the sequential data to the external system computing device 110. As one concrete example, if the external system computing device 110 is a securities exchange server, a plurality of buy and sell orders generated by the source computing devices 108 may first be sent to one or more of the consensus nodes 102 for recording on the blockchains 112, and then forwarded to the securities exchange server. Furthermore, in some examples, a copy of the sequential data 122 may be forwarded immediately to the external system computing device 110, rather than waiting until the sequential data has been recorded on one of the blockchains 112.

Additional functional components include a blockchain program 226 and an operating system (OS) 214. For example, the blockchain program 226 may be executed to configure the processor 202 to record and/or read the blockchains 112 stored in the blockchain storage 113. Furthermore, the operating system 214 may control and manage various functions of the consensus node 102.

Each of the functional components may include one or more computer programs, applications, executable code, processor-executable instructions, or portions thereof. Any of these functional components may be combined with any other or separated therefrom. For example, while the leader node program 216, sequential data receiver 218, block generator 220, and sequential data transferor 222 are illustrated as part of the node program 114 in this example, in other examples, these programs may be separate, may each include multiple separate programs, may be combined into a single program, and so forth. In some cases, the functional components may be stored in the local storage 210 of the computer-readable media 206, loaded into the memory 212 of the computer-readable media 206, and executed by the one or more processors 202. Numerous other software and/or hardware configurations will be apparent to those of skill in the art having the benefit of the disclosure herein.

In addition, the computer-readable media 206 may store data and data structures used for performing the functions and services described herein. For example, the computer-readable media 206 may store data, metadata, data structures, and/or other information used by the node program 114, the consensus program 116, the blockchain program 226, and/or the operating system 214. For instance, some or all of the consensus nodes 102 may maintain separate copies of each of the blockchains 112.

Further, the leader consensus node may maintain in its memory 212, a last piece of sequential data 228 that corresponds the last piece of sequential data (i.e., the last entry) in a most-recently generated block that was last created by the leader consensus node. As discussed above, in some examples, this may be used for determining a sequential order of blocks storing sequential data spanning across multiple different blockchains.

Additionally, each consensus node 102 may also include or maintain other functional components and data, which may include programs, drivers, etc., and other data used or generated by the functional components. Further, the consensus node 102 may include many other logical, programmatic, and physical components, of which those described above are merely examples that are related to the discussion herein.

The communication interface(s) 204 may include one or more interfaces and hardware components for enabling communication with various other devices, such as over the network(s) 104. Thus, the communication interfaces 204 may include, or may couple to, one or more ports that provide connection to the network(s) 104 for communication with other consensus nodes 102, the source device(s) 108, the auditing computing device(s) 106, and the external system computing device(s) 110. For example, the communication interface(s) 204 may enable communication through one or more of a LAN (local area network), WAN (wide area network), the Internet, cable networks, cellular networks, wireless networks (e.g., Wi-Fi) and wired networks (e.g., Fibre Channel, fiber optic, Ethernet), direct connections, as well as close-range communications, such as BLUETOOTH®, and the like, as additionally enumerated elsewhere herein.

The one or more networks 104 may include any suitable communication technology, including a wide area network, such as the Internet; a local area network, such as an intranet; a wireless network, such as a cellular network; a local wireless network, such as Wi-Fi; short-range wireless communications, such as BLUETOOTH®; a wired network including Fibre Channel, fiber optics, Ethernet, or any other such network, a direct wired connection, or any combination thereof. Thus, the network(s) 104 may include wired and/or wireless communication technologies. The protocols used to communicate over such networks are well known in the art and will not be discussed in detail in this disclosure.

The I/O devices 208 may include a display, various user interface controls (e.g., mouse, keyboard, touch screen, etc.), audio speakers, connection ports, and so forth. Numerous other hardware and software configurations will be apparent to those of skill in the art having the benefit of the disclosure herein. Thus, the scope of the examples disclosed herein is not limited to a particular set of hardware, software, or a combination thereof.

Figure 3:
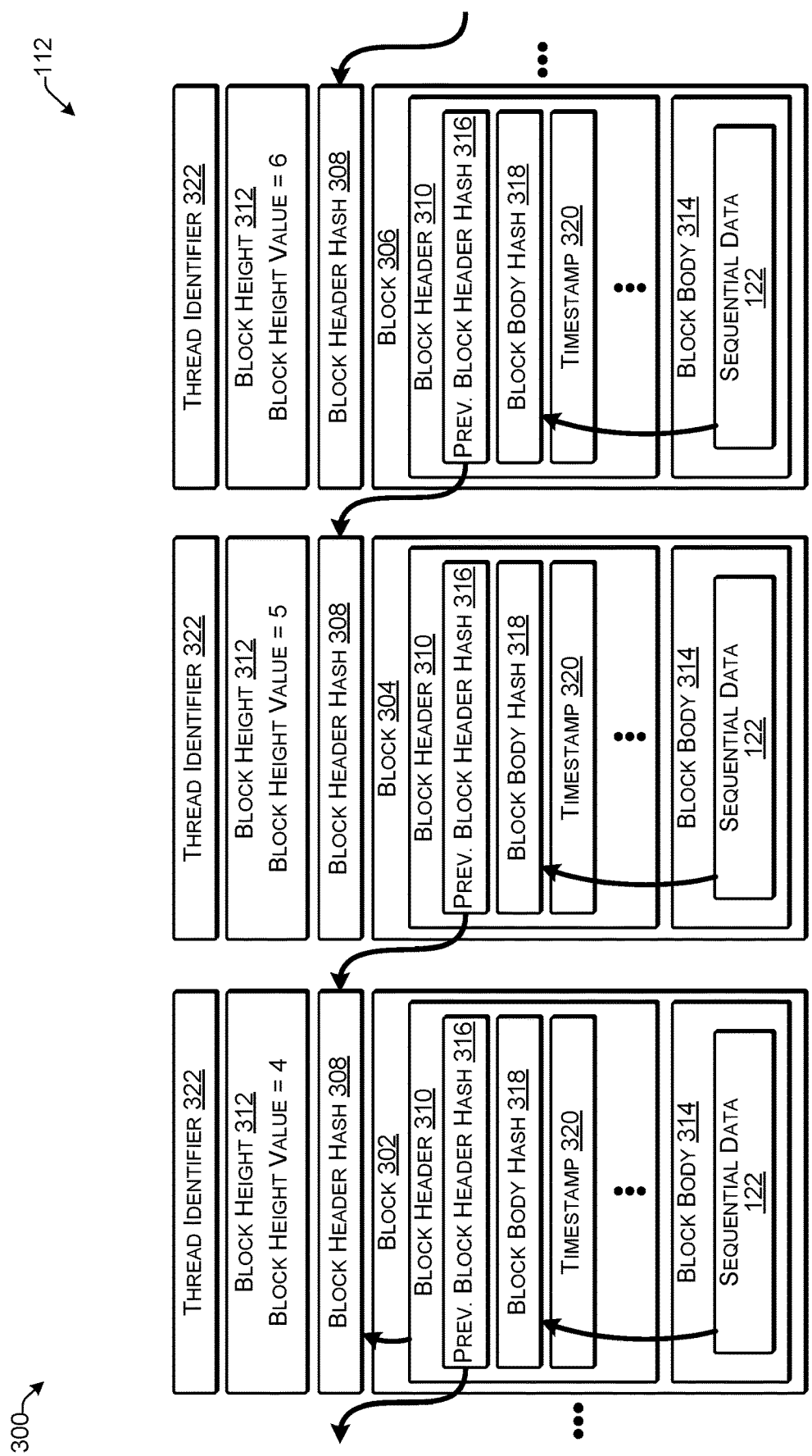
FIG. 3 illustrates an example blockchain data structure according to some implementations.

FIG. 3 illustrates an example blockchain data structure 300 according to some implementations. In this example, the fifth, sixth, and seventh blocks of the blockchain 112 of FIG. 3 are illustrated, i.e., block 302 is the fifth block, block 304 is the sixth block, and block 306 is the seventh block in the blockchain 112. Further, the blockchain 112 includes other blocks not shown in FIG. 3.

The primary identifier of a block in a blockchain is its block header hash 308. The block header hash 308 is a digital fingerprint, typically made by hashing a block header 310 twice using, e.g., the SHA256 algorithm, the SHA-2 algorithm, or the like, although other techniques and/or algorithms may be used. The resulting block header hash 308 is a 32-byte hash value that uniquely represents the header of the corresponding block. The block header hash 308 can be independently derived by any consensus node or user by simply hashing the block header 310 of the particular block.

Typically, the block header hash 308 is not included inside the block data structure when the block is stored as part of the blockchain. Rather, the block header hash 308 may be calculated by a node, e.g., as the block is generated on the node or received from another node. As one example, each node that maintains a blockchain may maintain a corresponding metadata data structure (not shown in FIG. 3) that includes block header hashes 308 for all the blocks in each blockchain 112, as well as other metadata for the blockchains 112.

In addition, the blocks in a blockchain may be identified by a block height 312, which is the sequential position of the block in the blockchain. For instance, the first block in a blockchain (i.e., the "genesis" block) may have block height of zero. As new blocks are added to the blockchain 112, the new blocks are sequentially numbered using increasing positive integers. Each subsequent block added on to the previous block is one position higher in the blockchain. The block height 312 is also typically not a part of the block's data structure, i.e., is not stored within the block itself. Rather, each consensus node 102 or other computing device may dynamically identify each block's position (block height 312) in the blockchain 112. Alternatively, in some cases, the block height information may be stored by the consensus node as metadata. Thus, in the illustrated example, block 302 has a block height value=4, block 304 has a block height value=5, and block 306 has a block height value=6. In addition to the block header 310, each block includes a block body 314, which may include the sequential data 122 or other content or information being stored by the block.

The block header 310 for each block includes a previous block header hash 316 of the previous block. For example, block 304 includes a previous block header hash 316 that is the block header hash of block 302, while block 306 includes a previous block header hash 316 that is the block header hash of block 304. Consequently, the order of the blocks in the blockchain 112 may be determined by comparing the previous block header hash 316 in each block with the block header hash 308 calculated for each block.

In addition, the block header 310 may include a block body hash 318 and a timestamp 320 corresponding to a time at which that block was created, as well as other possible information not shown in this example. In some cases, the block body hash 318 may be calculated as a Merkle tree, such as in the case that the blockchain 112 is used to store a large number of transactions. However, in other cases, other techniques may be used for hashing the block body 314, such by using the SHA256 hash algorithm discussed above. In either case, because a hash 318 of the block body 314 is included in the block header 310, and because a block header hash 308 of the block header 310 is used to identify the block, it is not possible to alter the data in the block body 314 without changing the value of the block header hash 308, thereby changing the identifier of the block and providing evidence that the block contents have been altered.

In addition, in this example, each block 302, 304, 306 includes a thread identifier (ID) 322 associated with it. In some examples, the thread ID 322 may serve as or otherwise correspond to a blockchain ID. For example, as discussed additionally below, a first thread may be executed to generate a first blockchain, a second thread may be executed to generate a second blockchain, and so forth. Accordingly, in some examples, all the blocks in the same blockchain 112 may have the same thread ID 322. In this example, the thread ID 322 may be maintained in separate metadata associated with each blockchain such as with the block header hashes 308, or elsewhere. Alternatively, as another example, the thread identifier 322 may be incorporated into the block header 310 of each block. Further, any other type of blockchain identifier may be used in addition to, or instead of, the thread ID 322 for uniquely identifying or otherwise individually distinguishing the corresponding blockchain within the consensus system.

Figure 4:
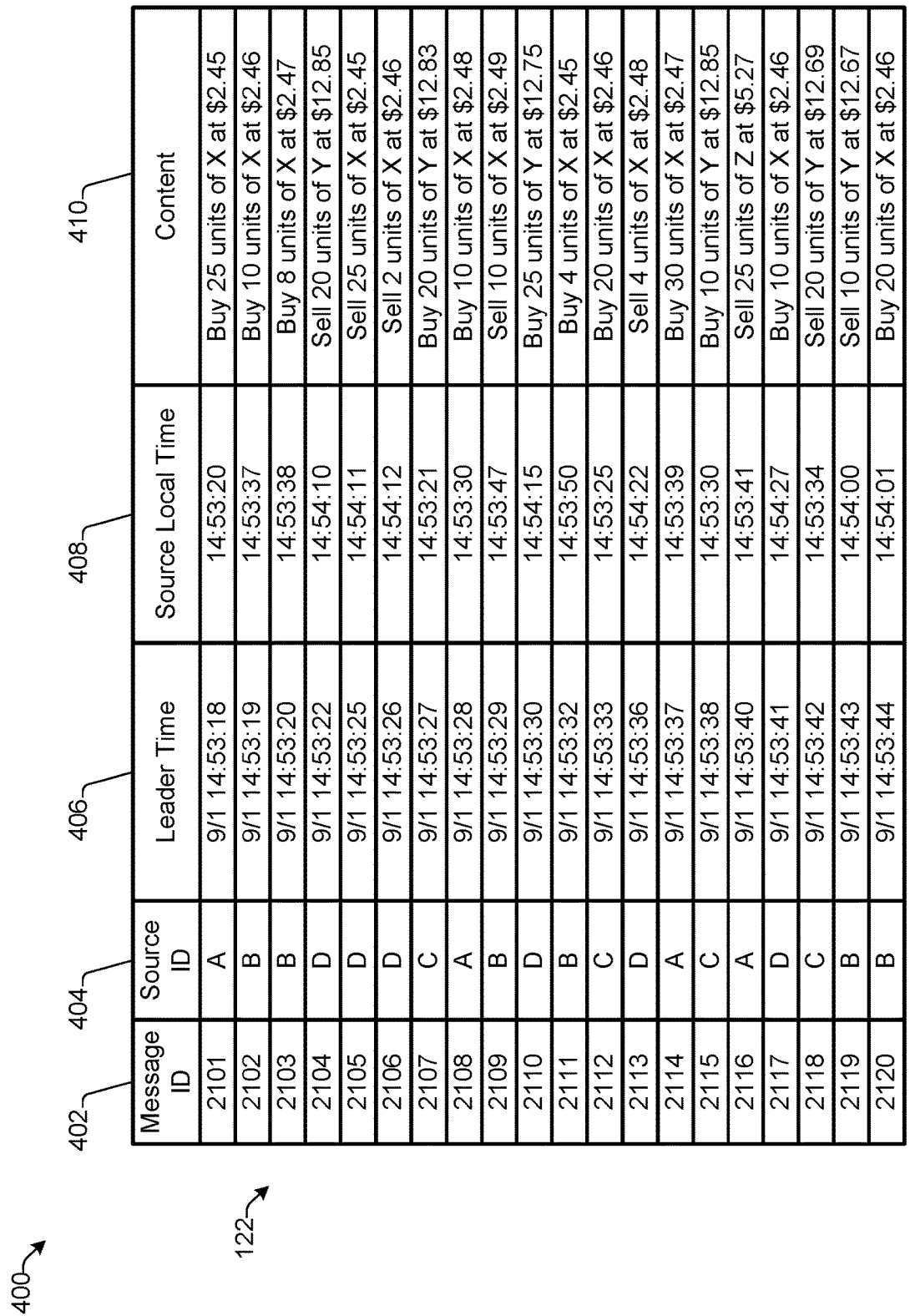
FIG. 4 illustrates an example data structure of the sequential data storage according to some implementations.

FIG. 4 illustrates an example data structure 400 of the sequential data storage according to some implementations. The data structure 400 may be maintained at least by the leader consensus node when the leader consensus node receives the sequential data 122. For example, the sequential data storage 224 stores messages and local time information received from the source computing devices 108 discussed above with respect to FIG. 1. In this example, there are four individual sources having source IDs A-D. Each source may have its own clock so the source times may or may not be synchronized with each other. In this example, the source clocks are not synchronized with each other. However, the local times for the messages from each source are chronological according to the clock for that source. As mentioned above, in some cases the data structure 400 may be a FIFO queue, and the sequential data may be deleted from the data structure 400 after the sequential data has been recorded to a blockchain.

The data structure 400 includes a message ID column 402, which shows a unique or otherwise individually distinguishable ID assigned to each received message by the leader consensus node when the leader consensus node receives the message, either directly from a source computing device, or from another consensus node.

In addition, the data structure 400 includes the source ID column 404, which shows an identifier of the source computing device that sent the message to the consensus system. Each message source can be distinguished based on the corresponding source ID in column 404.

Column 406 of the data structure 400 includes the leader time, which is a timestamp or other time information applied by the leader consensus node to each received piece of sequential data indicating the time and date at which the leader consensus node received the piece of sequential data. In this example, the leader consensus node arranges the received messages in the data structure 400 based on the leader time indicted in column 406, i.e., as the messages are received chronologically by the leader consensus node.

Column 408 of the data structure 400 includes the source local time, which is a time associated with the sequential data. For example, the source local time may be a time and date added by the source computing device to the sequential data when the sequential is sent to the consensus system. Accordingly, the source local time 408 may be recorded in the message received from the source computing device and may correspond to the time at which the individual message is sent by the source computing device, or the like. Unlike the leader time 406, the source local time 408 may not be sequenced in the chronological order by which the leader consensus node received the message. For example, because each different source computing device may have a different clock, and these clocks may not be synchronized with each other, the messages may be received with source local times that are not in chronological order.

Column 410 of the data structure 400 includes data content of the sequential data. The data content in column 410 may be included in a message or other electronic communication from the source computing devices. In this example, the content relates to securities transactions, and may be a buy or sell order. In other applications, other types of data content may be included in the data structure 400 such as, for example, log entries, descriptions of events, transaction information, or the like. Accordingly, the content data is not limited to trading orders, or the like, but may be any type of sequential data content.

Figure 5:
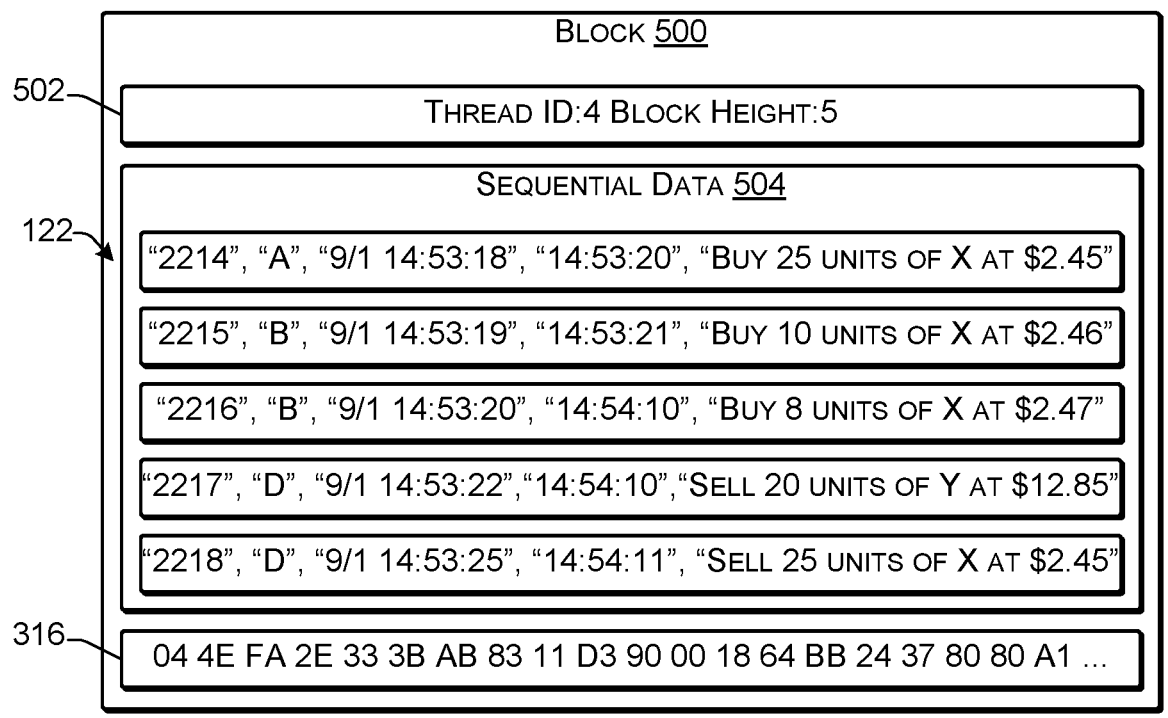
FIG. 5 illustrates an example simplified structure of a block of a blockchain according to some implementations.

FIG. 5 illustrates an example simplified structure of a block 500 of a blockchain according to some implementations. For instance, for clarity of illustration in the examples of FIGS. 8-10, only portions of the blocks relevant to the discussion are illustrated. In the example of FIG. 5, the block 500 of a blockchain includes a thread ID and block height (BH) that are associated with the block 500, as indicated at 502, and as discussed above with respect to FIG. 3. Furthermore, the block 500 includes the sequential data 504 that is stored in the block body of the block, as discussed above with respect to FIG. 3. In this example, the block body includes five entries of sequential data, i.e., five messages or five pieces of sequential data received by the leader consensus node. However, in other examples, more or fewer entries of sequential data may be included in the block body, depending, e.g., on the size of the content data of each piece of sequential data, the desired size of each block in the blockchain, network latency for determining a consensus, and so forth. In addition, the block 500 includes the previous block header hash 316, as discussed above with respect to FIG. 3, which identifies the immediately previous block in the blockchain.

Figure 6:
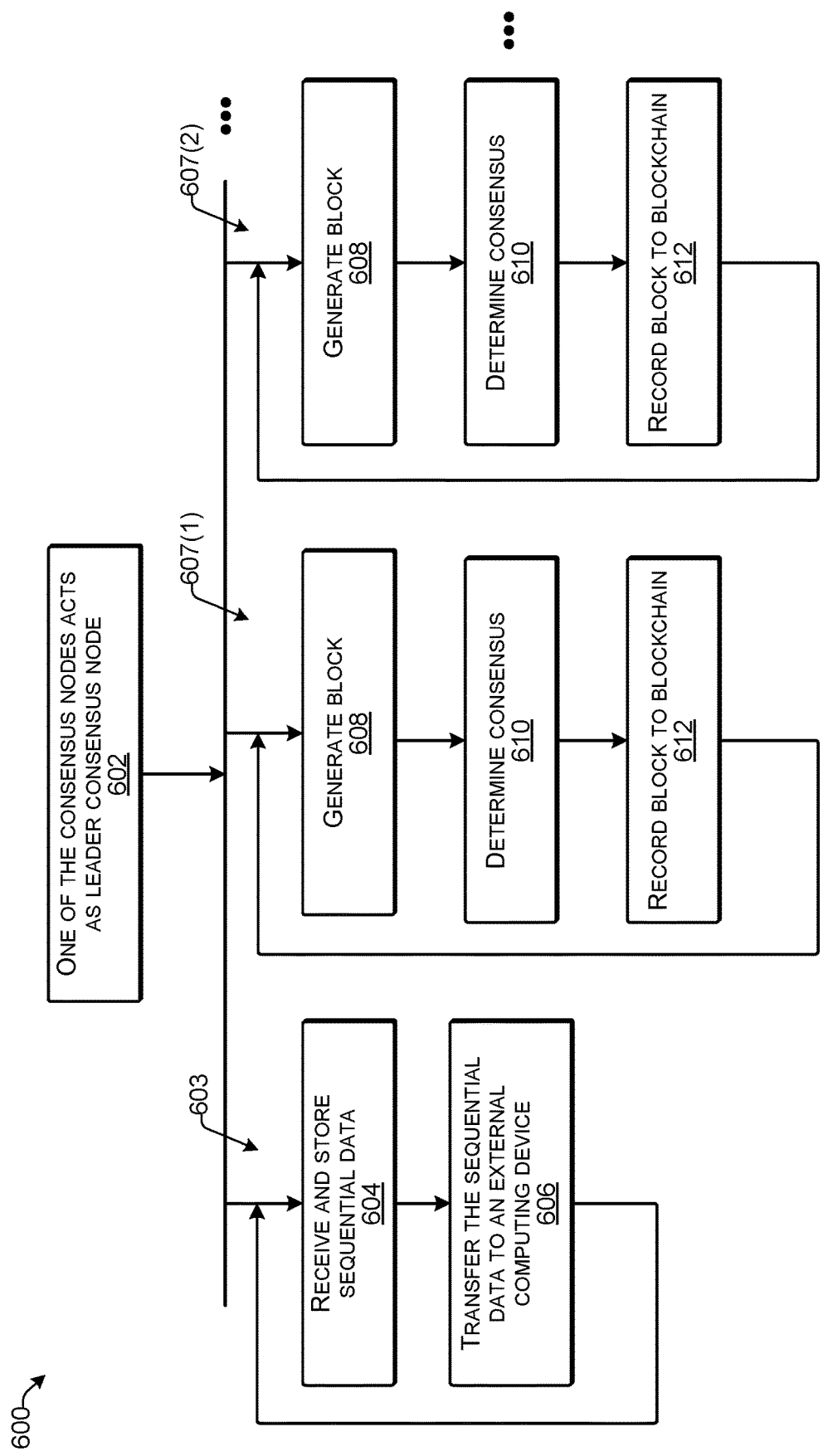
FIG. 6 is a flow diagram illustrating example processes executed by the leader consensus node according to some implementations.
Figure 11:
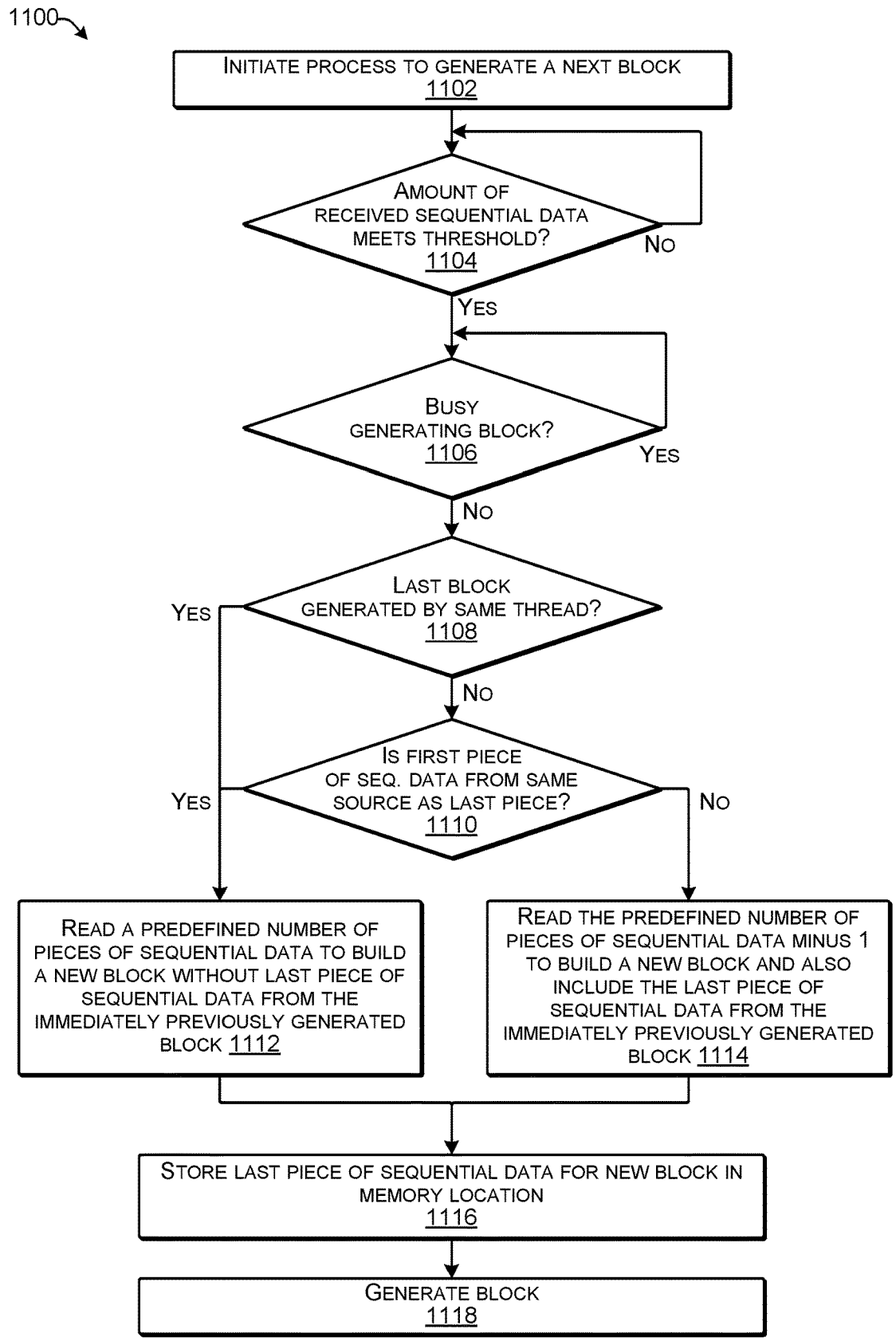
FIG. 11 is a flow diagram illustrating an example process for generating a block to store sequential data according to some implementations.
Figure 12:
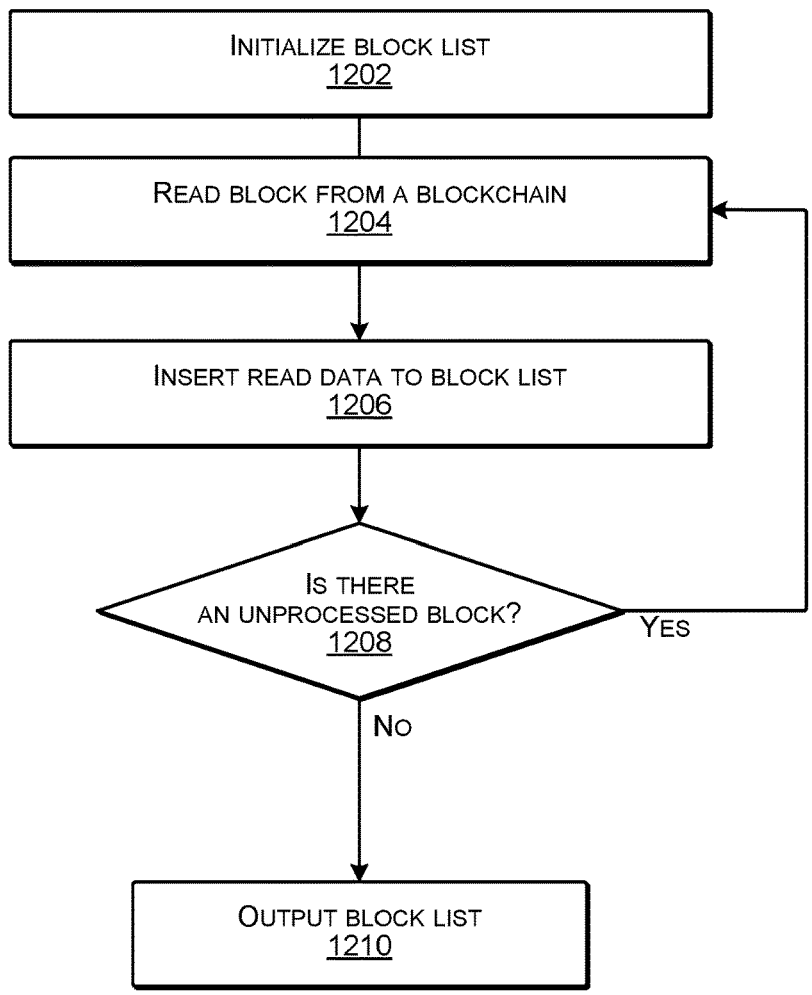
FIG. 12 is a flow diagram illustrating an example process for auditing of blockchains and/or serializing the sequential data maintained in multiple blockchains according to some implementations.

FIGS. 6, 11, and 12 are flow diagrams illustrating example processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks and systems described in the examples herein, although the processes may be implemented in a wide variety of other environments, frameworks and systems.

FIG. 6 is a flow diagram illustrating example processes 600 executed by the leader consensus node according to some implementations. The processes 600 may be performed by the leader consensus node 102 or other suitable computing device(s) in a consensus system.

At 602, one of the consensus nodes in the consensus system acts as the leader consensus node. For example, there may be a plurality of consensus nodes in the consensus system and one of the consensus nodes may act as the leader consensus node for the consensus system. Various techniques for selecting the leader consensus node are discussed above e.g., with respect to FIG. 1. If the leader node should fail, one of the other consensus nodes may take over and begin acting as the leader node. Furthermore, the other consensus nodes participating in the consensus system serve to form the consensus and also generate and store their own blockchains as a consensus is reached on new blocks for each blockchain.

The leader consensus node may execute multiple threads (i.e., processes) concurrently, including a first thread 603, including block 604 and 606, for managing the received sequential data, and multiple second threads 607, including block 608 through 612, for building blockchains from the received sequential data. In some cases, when the leader consensus node starts the leader node program 216 discussed above, e.g., with respect to FIG. 2, the leader node program may create a maximum number of threads. For instance, the maximum number of threads may have been previously set in the memory of the leader node. As non-limiting examples, the maximum number of threads may be 8 threads, 10 threads, 12 threads, or so forth. Accordingly, the leader node program may create the maximum number of threads and then may suspend at least some of the threads temporarily until needed. Furthermore, each thread may have a thread ID that can be used to distinguish the threads from each other and the corresponding blockchain from other blockchains stored in the blockchain storage 113. As one example, the leader consensus node may set the thread ID to all threads when it starts the threads during startup of the leader node program. For instance, the thread IDs may be natural numbers starting with one, or other suitable numbering systems may be used.

Additionally, if the processor of the leader consensus node is not being fully utilized, and there is a large number of sequential data being received and/or already in the sequential data storage waiting to be added to a blockchain, the leader consensus node may increase the number of threads being utilized e.g., by restarting a previously suspended thread. For instance, reach a consensus may require numerous communications among the consensus nodes so that the time that it takes for a region a consensus may depend on latest the latency of communication among census nodes as well as latency within the nodes themselves. By increasing the number of threads, the overall throughput of building blocks and obtaining consensus can be increased according to the implementations herein.

On the other hand, if the processor of the leader consensus node is already near maximum processing capacity, or, if there are less than a threshold number of backlogged pieces of sequential data in the sequential data storage, the leader node may suspend one or more currently executing threads e.g., temporarily, and before beginning the generation of a next the block within that thread.

At 604, the computing device may receive and store sequential data. For example, as discussed above, the leader consensus node may receive sequential data from a plurality of data source computing devices and/or from other nodes in the consensus system that received the sequential data from the data source computing devices. Upon the receipt of the sequential data, the leader consensus node may store the sequential data in a sequential data storage, such as the data structure 400 discussed above with respect to FIG. 4. In some examples, each received piece of sequential data includes time information (e.g., date and time) that the source of the data associated with the piece of sequential data, and may further include an identifier of the source of the sequential data, and the data content itself. Furthermore, in other examples, the sequential data may include additional metadata and/or content data or the like.

At 606, the computing device may transfer the sequential data to a destination of the sequential data such as to an external computing device. In some examples, the leader consensus node may transfer the received sequential data to another computing device for further processing. As one example, such as in the case of the sequential data being a series of securities exchange orders or the like, the consensus system may serve to record the received orders and may forward the received orders to the securities exchange system for processing of the orders. Numerous other variations are possible, however, and in other implementations, the received sequential data might not be transferred to another computing device. The process of receiving, storing, and transferring the sequential data may be repeated continuously as the sequential data is sent by the sources of the sequential data.

At 607(1) and 607(2), the computing device executes a plurality of threads or otherwise executes multiple processes for generating multiple blockchains corresponding to the multiple threads. Each thread may execute blocks 608 through 612 when generating a blockchain. Furthermore, while two threads 607 are illustrated in this example, the number of threads that may be executed concurrently is not limited to him may include the creation of three or more blockchains concurrently according to the techniques described herein.

At 608, the computing device generates a block for the corresponding blockchain. For example, as discussed additionally below, e.g., with respect to FIG. 11, the leader consensus node may generate a block for the blockchain from the received sequential data, such as a block having a configuration as discussed above, e.g., with respect to FIGS. 3 and 5.

At 610, the computing device determines a consensus for the generated block. For example, the leader consensus node may send the newly generated block, or at least information about the generated block to the other consensus nodes in the consensus system to determine a consensus for the generated block. Examples of techniques for determining a consensus, such as the Raft Consensus Algorithm, are discussed above with respect to FIG. 1.

At 612, if a consensus has been reached, the computing device may record the block to the corresponding blockchain. For example, a first block generated by the first thread indicated at 607(1) may be added to a first blockchain, while a second block generated by the thread indicated at 607(2) may be added to a corresponding second blockchain. Furthermore, as discussed above, the thread ID may be associated with the corresponding blockchain generated by that thread, and, in some cases, may subsequently be used as the blockchain identifier for that blockchain.

Figure 7:
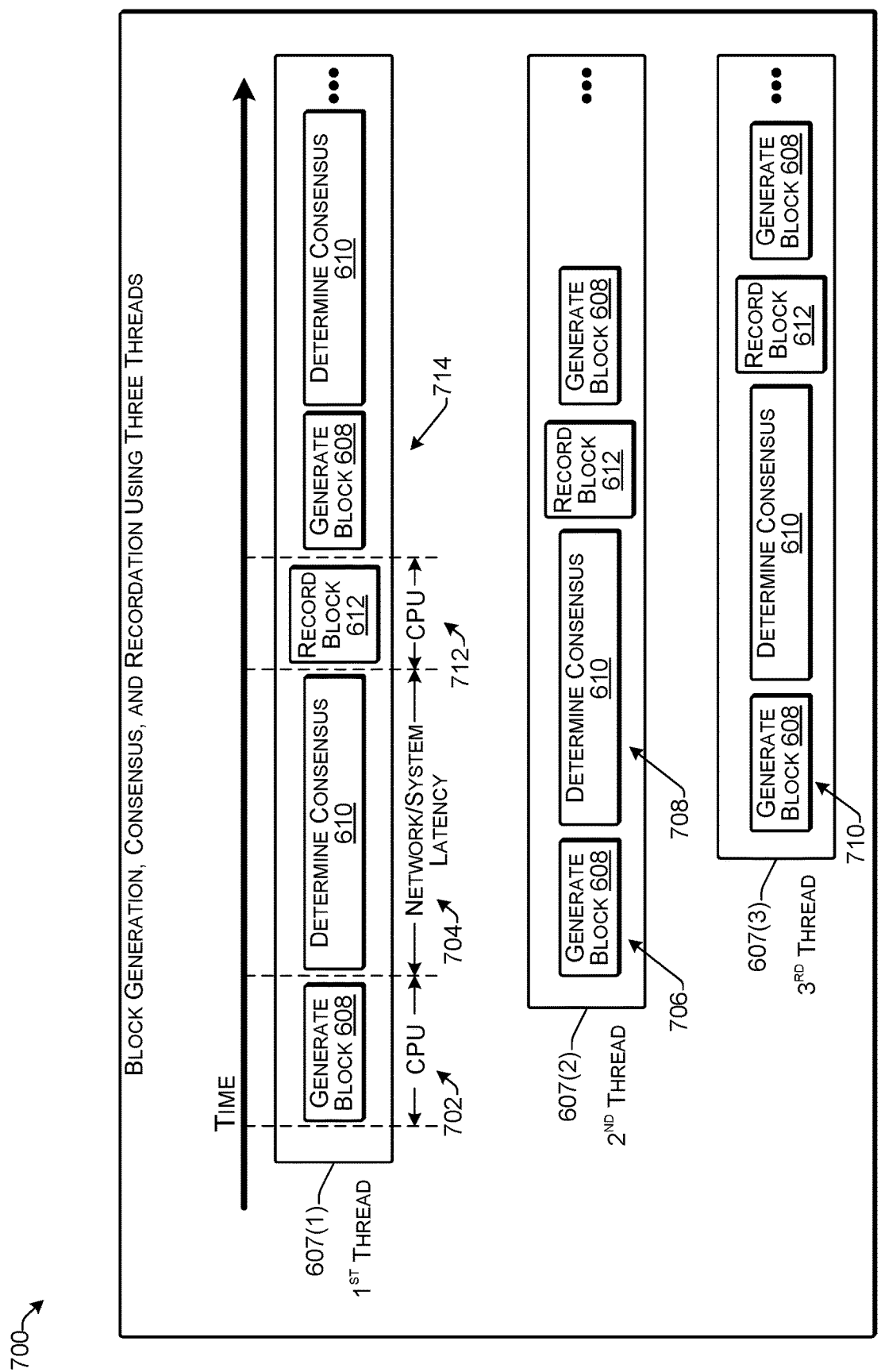
FIG. 7 illustrates an example of thread execution timing by the leader node according to some implementations.

FIG. 7 illustrates an example of thread execution timing 700 by the leader node according to some implementations. In this example, the leader node may be executing three threads 607(1)-607(3) for generating three separate blockchains for storing sequential data. In this example, the timing of the thread execution of the first thread 607(1) may be offset from the timing of execution of the second thread 607(2) and third thread 607(3) so that the processor of the leader consensus node may be utilized for generating a block in the second thread 607(2) and the third thread 607(3) while a consensus is being obtained for a block already generated by the first thread. For instance, as indicated at 702, the leader node may use a CPU to generate a first block in the first thread 607(1). Next, the leader node may seek to determine a consensus 610 for the generated block by messaging the other consensus nodes in the consensus system. As mentioned previously, this consensus determination 610 process may be relatively slow due to network and/or system latency, as indicated at 700 for. Accordingly, while the consensus determination is ongoing for the first thread 607(1), the leader node may use the CPU to generate a block in the second thread, as indicated at 706. Upon completion of that task, the leader node may seek a consensus for the block in the second thread, as indicated at 708, and may generate a block in the third thread 607(3), as indicated at 710.

Subsequently, in the first thread 607(1), when the consensus has been determined, the leader consensus node may record the block to the blockchain corresponding to the first thread 607 one, as indicated at 712. The leader consensus node may then begin generation of a next block in the first thread as indicated at 714. Accordingly, this example illustrates that the use of multiple threads may improve the efficiency of the leader consensus node and the efficiency of the consensus system overall for recording a large amount of sequential data to blockchains.

Figure 8:
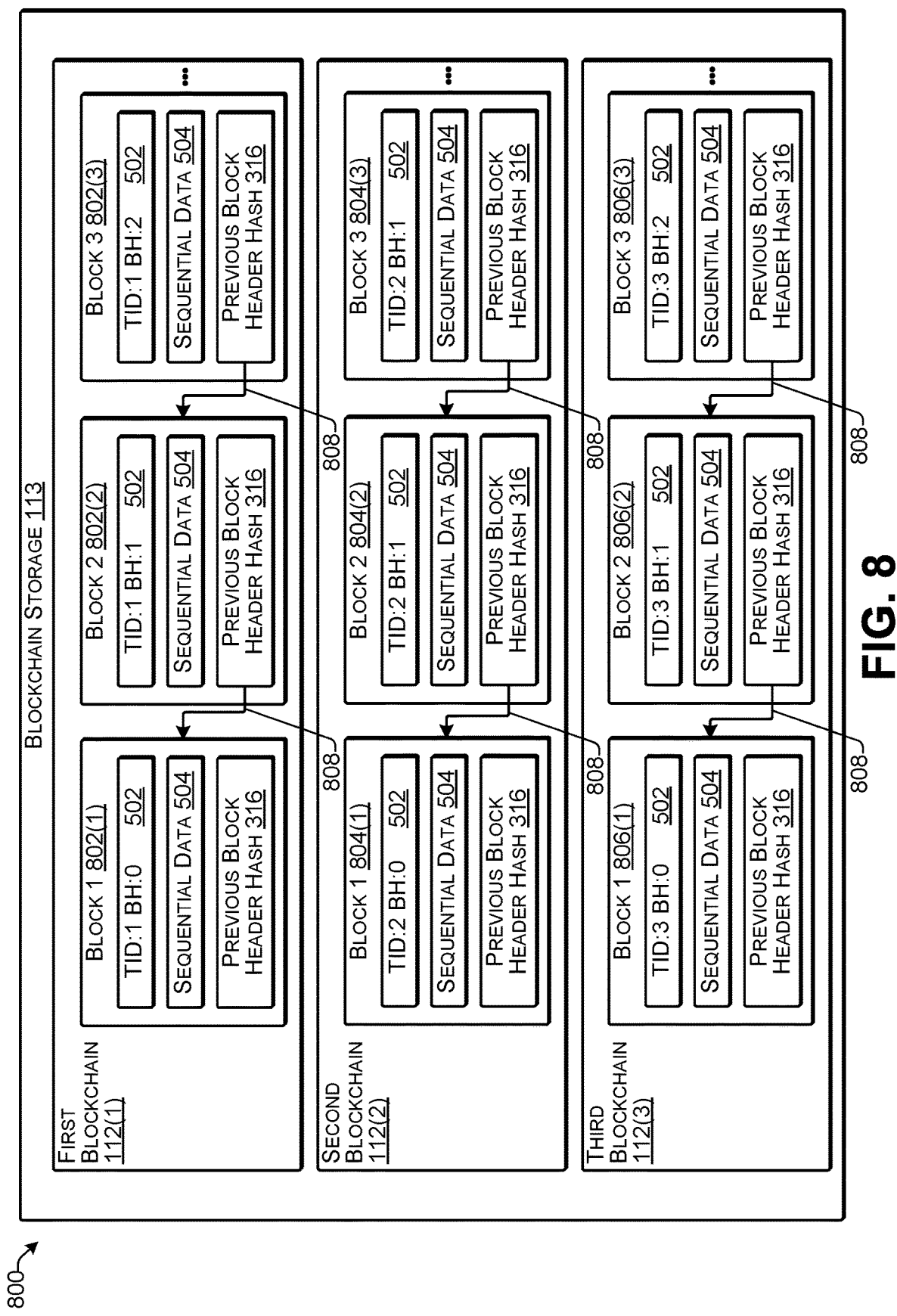
FIG. 8 illustrates an example logical configuration of a plurality of blockchains according to some implementations.

FIG. 8 illustrates an example logical configuration 800 of a plurality of blockchains according to some implementations. In this example, a plurality of blockchains 112(1), 112(2), and 112(3) have been generated and stored in the blockchain storage 113. For instance, the blockchain storage 113 may be maintained by each of the consensus nodes and may include a file system and/or database management system. Accordingly, the blockchain storage 113 may store data of multiple blockchains including the three illustrated in this example.

In this example, a first blockchain 112(1) includes at least blocks 802(1) through 802(3); a second blockchain 112 includes at least blocks 804(1) through 804(3); and a third blockchain 112 includes at least blocks 806(1) through 806(3). Furthermore, as discussed above, each block in the same blockchain 112 may have the same thread ID, as indicated at 502, may include sequential data 502, and may be virtually connected to the immediately previous block by the previous block header hashes 316, as indicated by arrows 808.

Figure 9:
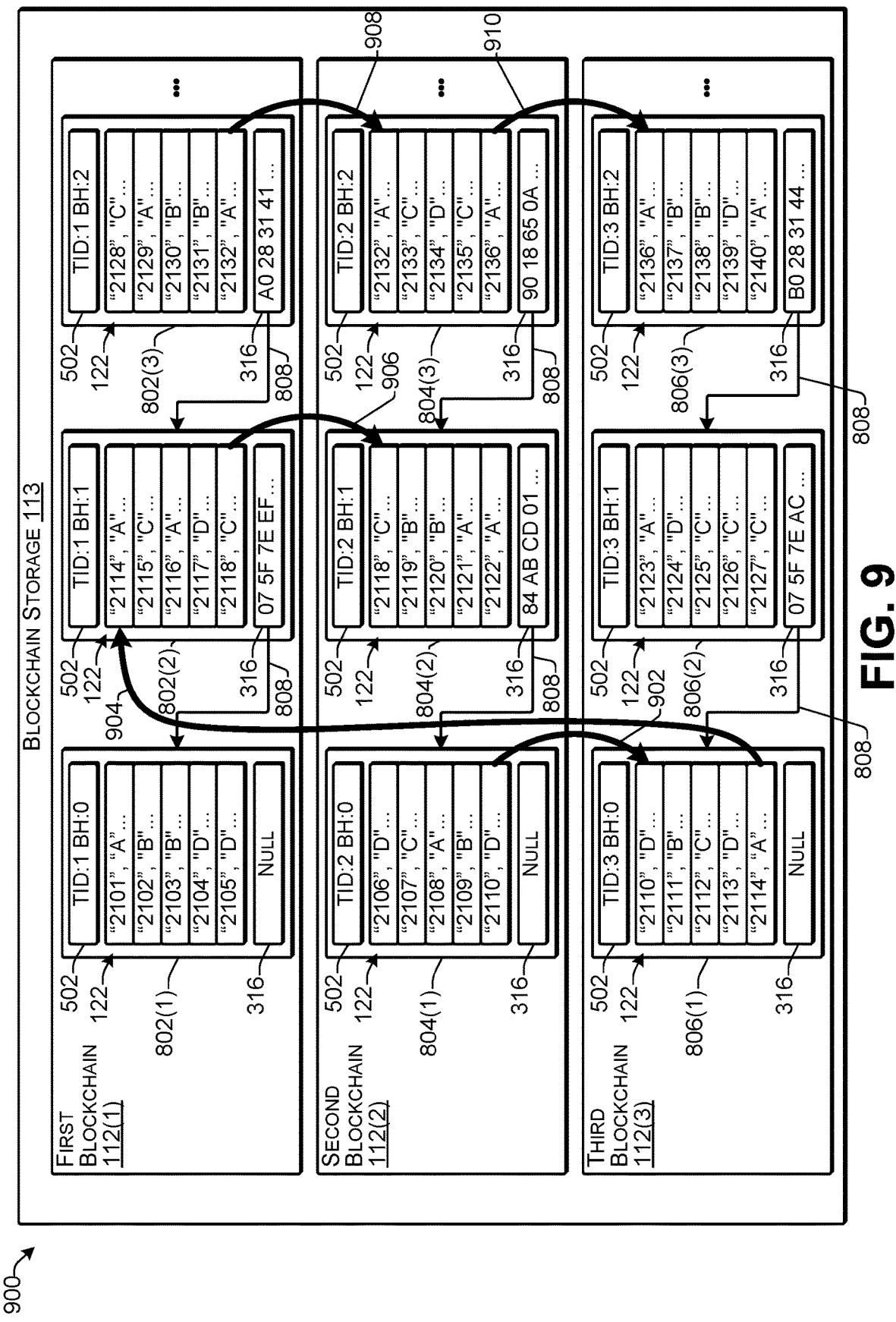
FIG. 9 illustrates an example logical configuration of a plurality of blockchains according to some implementations.

FIG. 9 illustrates an example logical configuration 900 of a plurality of blockchains according to some implementations. This example may correspond to the example discussed above with respect to FIG. 8 and illustrates how the sequential data stored in the blockchains may be reconstructed in the correct sequence and related based on information contained in the blockchains 112(1)-112(3). For instance, as discussed above, an order of the blocks and/or the sequential data contained within different blocks in different blockchains 112(1)-112(3) may be determined based on using at least a portion of the last data from a last block as the first data of a next block when generating the blocks. Further, in the case that the last data in the last block and the first data in the next block have the same source ID, that is not necessary to duplicate the last data in the next block as the first data in the next block.

In this example, the first blockchain 112(1) has a thread ID of "1", the second blockchain 112(2) has a thread ID of "2", and the third blockchain 112(3) has a thread ID of "3". The first block 802(1) in the first blockchain 112(1) includes five entries for the first five pieces of sequential data from the data structure 400 in FIG. 4, as indicated by the assigned message identifiers "2101"-"2105". Furthermore, the second block 802(2) in the first blockchain 112(1) includes five entries for five pieces of sequential data having the message identifiers "2116"-"2120". Accordingly, while the previous block header hash 316 for the second block 802 points to the first block 801, it is apparent from the first entry ("2116") in the second block 802(2) that the second block 802 is not the next block in sequence for the sequential data contained in the blockchain 112(1). Accordingly, when reconstructing the sequence of the data, such as for auditing or the like, a process may refer to the second blockchain to determine that the next piece of sequential data 2106 is at block 804(1). Further, since the next piece of sequential data 2106 is from the same source (i.e., source ID "D") as the previous piece of sequential data 2105, it is not necessary to duplicate the data of 2105 as the first entry of block 804(1).

On the other hand, when determining that the data in block 806(1) follows the data in block 804(1), rather than block 804(2) or block 802(2), an auditor program may determine that the last data entry of block 804(1) "2110" from source "D" is duplicated as the first data entry of block 806(1), as indicated by arrow 902. The duplication is performed because the next piece of data, "2111" from source "B" is a different source than source "D", i.e., the source of the immediately preceding piece of data "2110". Similarly, as indicated at arrows 904, 906, 908, and 910, the last piece of data in a block in one of the blockchains is duplicated as the first piece of data in another block in a different blockchain having data that sequentially follows the last piece of data. As one example, a full duplicate of the last data entered as a last entry in a block in one blockchain may be used as a first entry into the data in a new block in another blockchain. As another example, the data might only be partially duplicated in the next block, such as by only including a portion of the data from the last entry in the last block. For instance, just a source identifier (ID) (e.g., indicating the source computing device or other type of data source) and the source local time provided by the sender might be duplicated, while the data content and other portions of the data might not be included in the duplicated data. This alternative may be useful in the case that the data content is large.

Furthermore, when the data goes from block 804(2) to 806(2), the last piece of data might not be duplicated as the first entry of the first piece of data of block 806(2) because the data pieces "2122" and "2123" are both from the same source, i.e., source "A". Similarly, the transition from block 806(2) to block 802(3) does not include duplication of data because the data piece "2127" and the data piece "2128" are both from the data source "C". Thus, since it is not necessary to duplicate data to determine the next block between these blocks it is possible store more data than would be possible if the data were duplicated.

Figure 10:
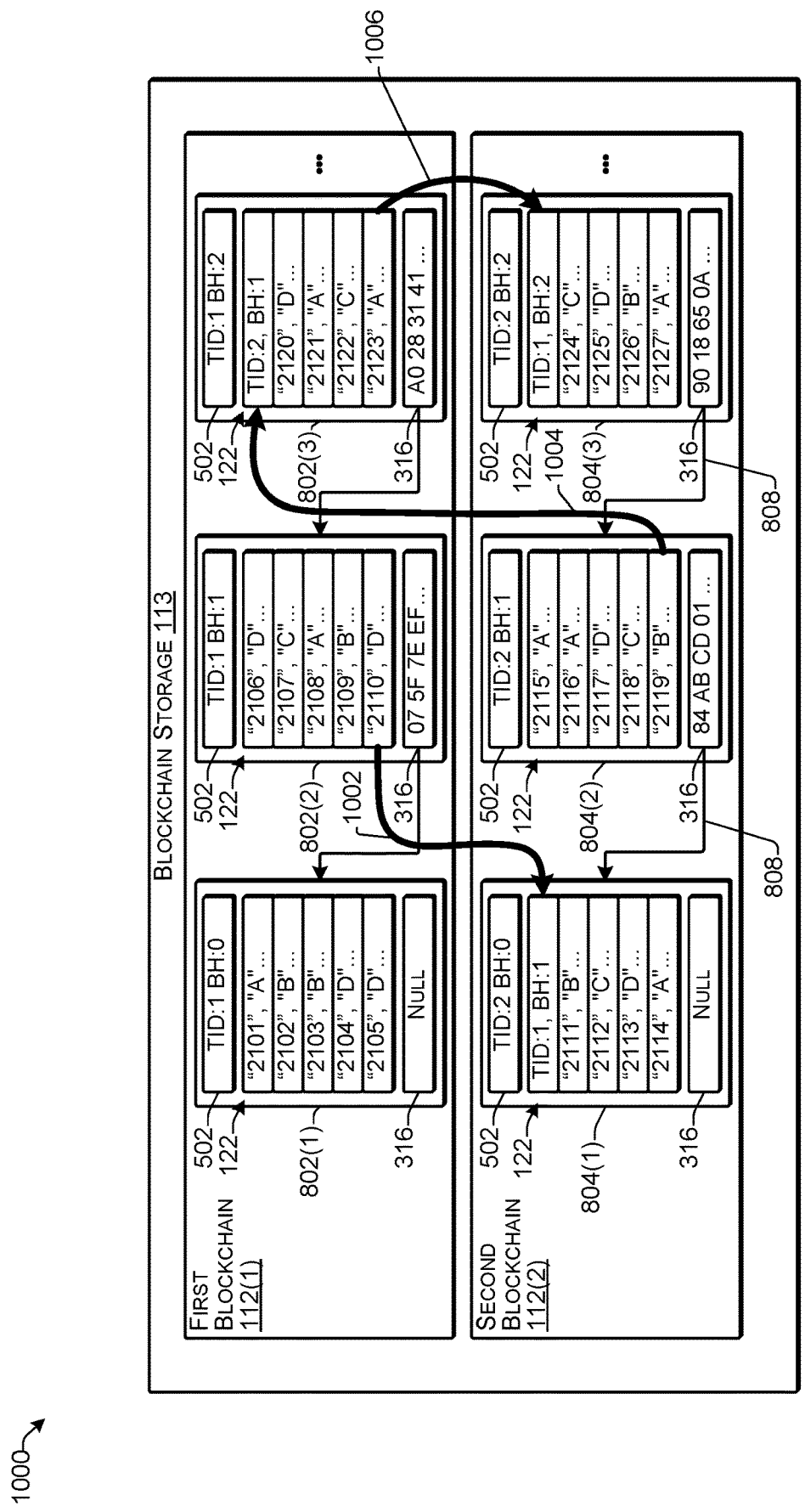
FIG. 10 illustrates an example logical configuration of a plurality of blockchains according to some implementations.

FIG. 10 illustrates an example logical configuration 1000 of a plurality of blockchains according to some implementations. This example includes two blockchains 112(1) and 112(2), rather than three. Further, in this example, another type of indicator, or the like, may be used in place of duplicating the data of the last entry. For example, the indicator may include identifying information about the preceding block itself in the other blockchain, such as a block ID and a blockchain ID or thread ID, or the like.

In this example, the data proceeds from block 802(1) to block 802(2) in the first blockchain 112(1). As indicated at arrow 1002, the sequential data is next entered in the first block 804 of the second blockchain 112. Accordingly, the first entry of the first block 804(1) includes a thread ID (TID) and a block height (BH) of the block with the immediately preceding data sequential data. Accordingly, the first entry in block 804 may be "TID:1, BH:1" to indicate that the immediately preceding data is in the block having a block height of "1" in the first blockchain corresponding to the thread ID of "1". Similarly, as indicated at arrow 1004 the first entry in block 802(3) is "TID:2, BH:1", which indicates that the immediately preceding sequential data is located at a block in the second blockchain 112(2) (corresponding to TID:2) having a block height of "1". Similarly, as indicated at arrow 1006 the first entry in block 804(3) is "TID:1, BH:2", which indicates that the immediately preceding sequential data is located at a block in the first blockchain 112(1) (corresponding to TID:1) having a block height of "2".

FIG. 11 is a flow diagram illustrating an example process 1100 for generating a block to store sequential data according to some implementations. In some examples, at least a portion of the process 1100 may be executed by the leader consensus node or other suitable computing device to perform the operation of block 608 discussed above with respect to FIG. 6.

At 1102, the computing device may initiate the process to generate a next block. For example, as discussed above with respect to FIG. 6, for each thread 607, following the recording of a block to the corresponding blockchain, the thread 607 may return to initiate the process for generating a next block at 608.

At 1104, the computing device may determine whether an amount of received sequential data in the sequential data storage meets a threshold minimum amount. For example, before the leader consensus node begins to generate a block, the leader consensus node may determine that there is a minimum amount of data in the FIFO queue so that blocks are not generated having less than a desired amount of data stored therein to avoid wasting resources. For instance, in the examples above, the blocks each included five data entries corresponding to five pieces of sequential data; however in other examples, the threshold may be a different amount depending on a desired block size, a size of the data content of the sequential data, a speed (e.g., bandwidth or latency) of the network, or other considerations for maximizing the throughput of consensus. If the amount of sequential data in the sequential data storage does not meet the threshold, the process may wait until the threshold amount of sequential data has been received. On the other hand, if there is at least the threshold amount of sequential data in the sequential data storage, the process may proceed to block 1106.

At 1106, the computing device may determine whether it is already busy generating another block, such as in another thread. For example, if the CPU usage is greater than 80 percent of capacity, the process may wait until the computing device has completed generating the other block or until the CPU uses is otherwise dropped to a lower level. If the computing device is not currently generating other block, the process may proceed to block 1108.

At 1108, the computing device may determine whether the last block, i.e., the block created immediately before the current block, was generated by the same thread, i.e., for the same blockchain, or for a different thread. For example, if the block to be generated is the next block in the same blockchain as the block last generated then it is not necessary to duplicate data to the new block.

At 1110, the computing device may determine whether the first piece of sequential data is from the same source as the last piece in the immediately previously generated block, regardless of whether the immediately previously generated block was generated using the same thread or generated using a different thread. For example, the leader consensus node may check the source ID of the first entry to be added to the new block and the source ID of the last entry in the immediately previously generated block to see if there is a match. If the two pieces of sequential data are from the same source, then the process proceeds to block 1112. On the other hand, if these two pieces of sequential data are from different sources, the process proceeds to block 1114.

At 1112, if the two pieces of sequential data are from the same source, the computing device may read a predefined number of pieces of sequential data from the sequential data storage 224 into the memory 212 (see, e.g., FIG. 2) for use in performing the operation of block 1118 below. Further, the computing device may delete the read pieces of sequential data from the sequential data storage 224.

At 1114, if the two pieces of sequential data are from different data sources, the computing device may use a previously stored last piece of sequential data 228 stored in the memory 212 (see FIG. 2) as the first entry in the new block when the block is generated. Further, the computing device may read the predefined number minus 1 number of pieces sequential data from the sequential data storage 224 into memory 212 for use in building the new block, and may delete these pieces of sequential data from the sequential data storage 224.

At 1116, the computing device may store the last piece of sequential data of the read sequential data in the memory 212 in place of any previously stored last piece of sequential data, e.g., as indicted above at 228 of FIG. 2. For example, each time a new block is generated, the last piece of sequential data entered in that block is stored at 228 in memory. Then, this last piece of sequential data can be used in block 1108 when determining whether the source ID of the last piece of sequential data matches the source ID of a first (i.e., next) piece of sequential data to be the first entry in a next block to be generated.

At 1118, the computing device may generate a new block for the blockchain based on either the pieces of sequential data obtained in either block 1112 or block 1114. To build the new block, the leader consensus node reads the pieces of sequential data from the memory 212, which have been determined in either block 1112 or 1114. In the new block, the leader consensus node associates a thread ID of the current thread with the new block, and copies the pieces of sequential data, such as at least the source ID, local source time, and the data content for each piece of sequential data. Furthermore, the leader consensus node may calculate a previous-block header hash for the previous immediately previous block in the same blockchain and perform other functions as discussed above for creating a block, such as with the features discussed above with respect to FIG. 3.

As one example suppose that the state of sequential data storage 224 is as shown in the data structure 400 of FIG. 4, and that the predefined number is 5. Accordingly during a first execution of blocks 1102-1116, the leader consensus node read pieces of sequential data with message IDs 2101-2105, generate a first block, and store the last piece of sequential data corresponding to message ID 2105 in as item 228. During a next execution of blocks 1102-1116, which may be in another thread, the first piece of sequential data is from the same message source as the last piece of sequential data stored as item 228 (i.e., they are both from source D), so block 1112 is executed, rather than block 1114, and the piece of sequential data corresponding to message ID 2110 is stored as item 228 in the memory 212. During a next execution of blocks 1102-1116, in another thread, the first piece of sequential data is from a different message source than the last piece of sequential data stored as item 228 (i.e., message ID 2110 is from source D and message ID 2111 is from source B), so block 1114 is executed, rather than block 1112, only four pieces of sequential data are read from the data structure 400, and the piece of sequential data corresponding to message ID 2114 is stored as item 228 in the memory 212. The process 1100 may be repeated continually as long as there is a threshold amount of data in the sequential data storage 224.

Furthermore, the leader consensus node may execute block 1118 concurrently in multiple threads, assuming there is sufficient CPU capacity. For example, the leader consensus node may execute blocks 1102 through 1116 serially, and may suspend other threads from entering block 1102 until a first executing thread has reached block 1118. Because blocks 1102 through 1116 are relatively simple steps, it will take relatively a very short time to execute these blocks. On the other hand, building a block as described in 1118 may utilize a greater amount of processing capacity and time, so concurrent execution of block 1118 by multiple threads may be employed to increase the throughput of processing so long as the maximum processing capacity remains below a threshold level as discussed above with respect to block 1106.

FIG. 12 is a flow diagram illustrating an example process 1200 for auditing of blockchains and/or serializing the sequential data maintained in multiple blockchains according to some implementations. In some examples, the process 1200 may be executed by the auditing program executed on the auditing computing device or other suitable computing device.

At 1202, the computing device may initialize a block list. For example, the auditing computing device may initialize a block list to serialize the sequential data maintained in the multiple blockchains on the consensus computing devices. Accordingly, the computing device may essentially re-create a listing of the pieces of the sequential data in a sequential order by reading the data from the blockchains.

At 1204, the computing device may read a block from a blockchain. For instance, the auditing computing device may access the blockchains maintained by any of the consensus computing devices for serializing the sequential data maintained in the plurality of blockchains stored by the consensus computing devices. In some examples, each of the consensus computing devices may store a complete copy of all of the blockchains stored by the other consensus computing devices in the consensus system.

At 1206, the computing device may insert the sequential data read from the block into the block list. For instance, in the examples discussed above, each block may include four or five pieces of sequential data that may be read from the block and added to the block list being generated by the auditing computing device. In some cases, the auditing computing device may locate the place in which to insert the pieces of data from the received block into an existing block list using the previous block head hash, and the source ID and the source local time of the first and last pieces of sequential data in the block. For example, the clock at any one source is assumed to be accurate for that source and so the sequential order of data from a particular source can be determined from the clock of that source regardless of when it was received by the consensus system. Accordingly, the source ID and the source local time may be used to determine the entire sequence of sequential data received from any one of the data sources.

At 1208, the computing device may determine whether there are any more unprocessed blocks. For example, if the auditing computing device is not yet access all of the blocks in all of the blockchains for a particular set of sequential data, the computing device may continue to access the blocks in the blockchains until all of the blocks have been accessed and read into the block list. Accordingly, if there are unprocessed blocks, the process may return to 1204. If all blocks have been processed, the process may continue to block 1210.

At 1210, the computing device may output the block list. For example, the auditing computing device may output the block was to a user such as an auditor, e.g., on a display, or may send the block list to another computing device such as a user computing device or to a storage location.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

FIG. 13 illustrates an example data structure 1300 of a block list that may be output by the auditing computing device according to some implementations. In this example, the data structure 1300 is similar to the data structure 400 discussed above with respect to FIG. 4 and includes a source ID column 1302, which shows an identifier of the source computing device that sent the message to the consensus system. Additionally, a column 1304 of the data structure 1300 includes the leader time, a column 1306 includes the source local time for each piece of sequential data, and a column 1308 include the data content of the sequential data. Furthermore, column 1310 includes the blockchain and block at which the sequential data is stored. Accordingly, as indicated at 1312, when the sequential data is duplicated to a second block during generation of the blockchains, the identifying information of both of the first block and the second block that include the duplicate sequential data may be included in the block list.

Figure 14:
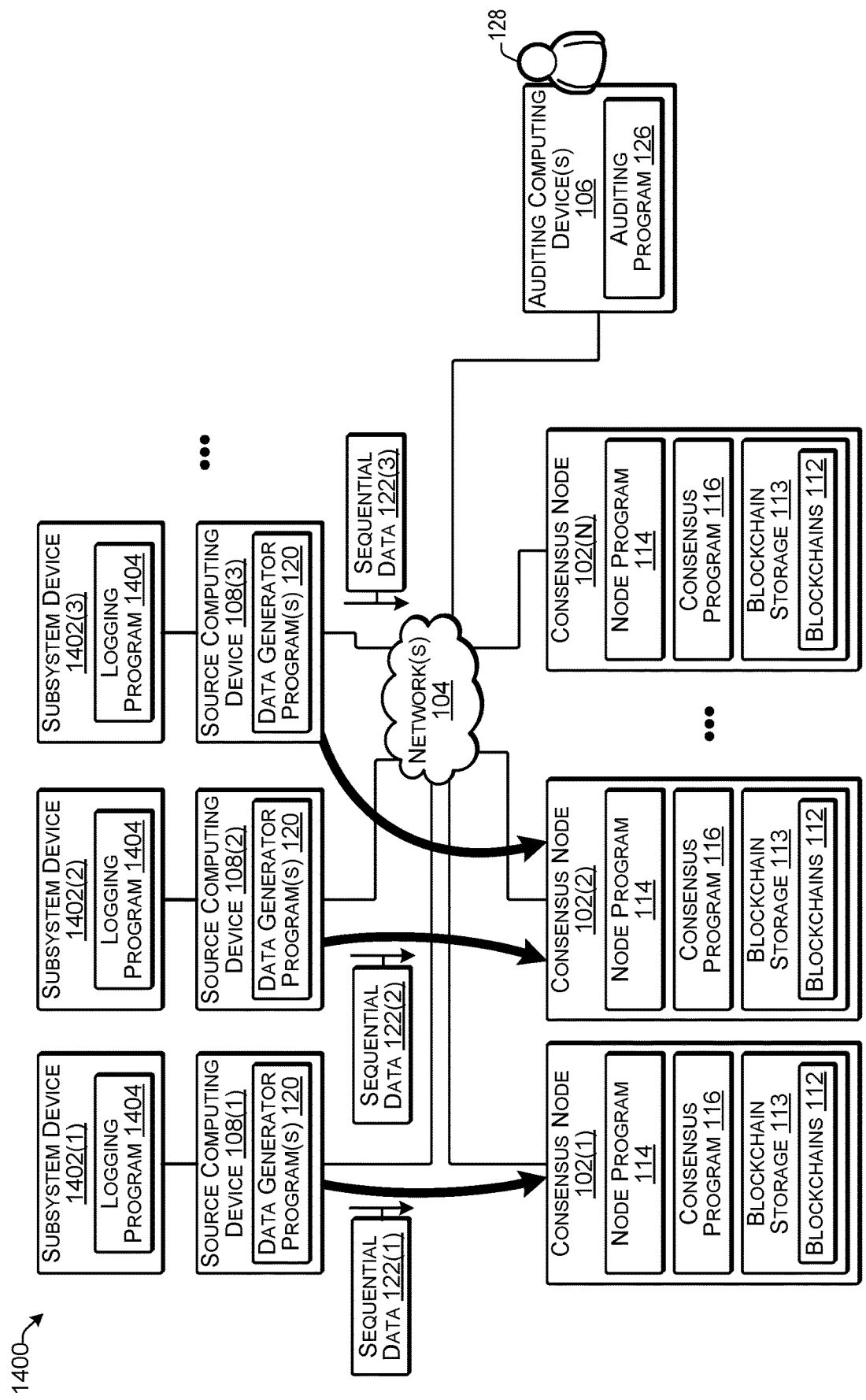
FIG. 14 illustrates an example architecture of a system for blockchain logging of data according to some implementations.

FIG. 14 illustrates an example architecture of a system 1400 for blockchain logging of data according to some implementations. For instance, implementations herein may be used in a variety of different types of systems for a variety of different types of applications. In this example, the consensus system may be used to receive system logs from multiple different systems such as for log management, e.g., recording the sequence of logs received from multiple subsystems.

The system 1400 is similar to the system 100 discussed above with respect to FIG. 1. Accordingly, only the differences between the two systems will be described herein. In this example, the external computing device may be eliminated, and a plurality of subsystem devices 1402 may be included, which may be in communication with the source computing devices 108 or may be part of the source computing devices 108. For example, a subsystem device 1402 (1) may be associated with source computing device 108(1), a subsystem device 1402(2) may be associated with source computing device 108(2), and a subsystem device 1402(3) may be associated with source computing device 108(3). Each subsystem device 1402 may be part of a complex system, and may include a logging program 1404.

The subsystem devices 1402(1)-1402(3) may communicate with each other, and the functionality of overall system may be achieved by combining the subsystem devices 1402. In this situation, it may be desirable to clarify the sequence of the system log of each subsystem. For example, when system malfunction occurs, the sequence of each concurrently running subsystem device 1402 may assist in determining what type of failure occurred, and which portion of the system may need to be repaired.

In this example, each subsystem device 1402 may generate entries including local time (e.g., date & time) and a log message generated by an application program, middleware, or other logging program 1404, which is sent by the source computing device data generator program 120 as the sequential data 122 to the consensus nodes 102. As one example, the logging program 1404 may contain many instructions to output log entries. When a subsystem device 1402 encounters such an instruction during execution of a program, the subsystem device may send log entries (e.g., text data generated by the logging program 1404) to an associated source computing device 108.

The source computing device 108 may act as described above, e.g., with respect to FIG. 1. As one example, the source computing device 108 may be a server that is independent from the associated subsystem device 1402. Alternatively, the source computing device 108 may execute on the same server or other computing device as the logging program 1404 of the subsystem 1402. As another example, one of the consensus nodes 102 may reside in subsystem device 1402.

By using blockchains to record logs from the subsystems 1402, an auditing computing device 106, or the like, may be able to define sequence of logs to each operator or developer of the subsystems 1402. Accordingly, this sequential data may be used as evidence to determine what type of failure may have occurred and how to fix it. Logs from the same subsystem 1402 may have the same local time set according to a clock of the sub system 1402. Consequently, a blockchain may record the sequence of logs from different subsystems 1402 in a manner similar to that discussed above for other types of sequential data, such as securities trading orders received from multiple different securities firms.

Various instructions, processes, and techniques described herein may be considered in the general context of computer-executable instructions, such as program modules stored on computer-readable media, and executed by the processor(s) herein. Generally, program modules include routines, programs, objects, components, data structures, executable code, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media. Thus, the index arrangement herein may be implemented on physical hardware, may be used in virtual implementations, may be used as part of overall deduplication system on either physical or virtual machine, and/or may be as a component for other deduplication implementations (e.g., SAN) or in some non-deduplication environments, such as large scale memory indexing.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
a first computing node able to communicate with one or more second computing nodes for participating in a consensus system which manages blockchains, wherein the first computing node includes one or more processors configured by executable instructions to perform operations comprising:
receiving, by the first computing node, a plurality of pieces of sequential data from a plurality of different data sources, wherein a source local time provided by a source computing device of each piece of sequential data and a source identifier (ID) of the source computing device are associated with each piece of sequential data;
executing a first thread to generate a block for a first blockchain, the first block including a first sequence of a plurality of the pieces of sequential data;
storing, as a most-recent last piece, in a memory location of the first computing node that is separate from the first blockchain, at least the source ID of a first source computing device and the source local time provided by the first source computing device that generated a last piece of sequential data of the first sequence, the last piece of sequential data included as the last piece of the first sequence entered in the block for the first blockchain;
executing a second thread to generate a block for a second blockchain;

checking the at least the source ID of the first source computing device and the source local time provided by the first source computing device and stored in the memory location of the first computing node for determining whether the source ID associated with the last piece of sequential data in the first sequence entered in the block for the first blockchain matches the source ID associated with a first piece of sequential data to be entered into the block for the second blockchain;

based on determining that the source ID of the last piece of sequential data entered in the first sequence in the block for the first blockchain is different from the source ID associated with the first piece of sequential data in a second sequence of a plurality of additional pieces of sequential data to be entered into the block for the second blockchain, associating an indicator with the block generated for the second blockchain, the indicator indicating the block in the first blockchain, by duplicating at least a portion of the last piece of sequential data from the first sequence stored in the block for the first blockchain and storing the duplicated at least the portion of the last piece of sequential data as a first entry in the second sequence of the sequential data in the block generated for the second blockchain; and replacing, the at least the source ID of the first source computing device and the source local time provided by the first source computing device, as an updated most-recent last piece, in the memory location of the first computing node, with at least the source ID of a second source computing device and the source local time provided by the second source computing device that generated a last piece of sequential data of the second sequence, the last piece of sequential data of the second sequence included as the last piece of the second sequence entered in the block for the second blockchain, wherein the memory location is also separate from the second blockchain.

2. The system as recited in claim 1, wherein duplicating at least the portion of the last piece of sequential data entered in the block for the first blockchain as the first entry in the second sequence in the block generated for the second blockchain comprises duplicating at least the source ID and the source local time associated with the last piece of sequential data by the data source of the last piece of sequential data, wherein there are a plurality of source computing devices corresponding to the plurality of different data sources of the sequential data, and each source computing device maintains its own source local time, wherein the source local time corresponds to a time at which a respective piece of sequential data is sent by a respective source computing device of the plurality of source computing devices.

3. The system as recited in claim 1, wherein associating the indicator with the block generated for the second blockchain further comprises including, in the block generated for the second blockchain, an identifier of the first blockchain and a block height of the block for the first blockchain.

4. The system as recited in claim 1, the operations further comprising:

executing a third thread to generate a block for a third blockchain;

determining whether the source ID associated with the last piece of sequential data entered in the block for the second blockchain matches the source ID associated with a first piece of sequential data to be entered into the block for the third blockchain; and based at least partially on determining that the source ID of the last piece of sequential data entered in the block for the second blockchain matches the source ID associated with the first piece of sequential data to be entered into the block for the second blockchain, using the first piece of sequential data as a first entry in the block generated for the third blockchain, wherein the first piece of sequential data immediately follows in sequence the last piece of sequential data entered in the block for the second blockchain.

5. The system as recited in claim 1, the operations further comprising:

storing the received sequential data in a first-in-first-out (FIFO) data structure;

transferring the received sequential data to an external computing device;

deleting a portion of the sequential data from the FIFO data structure based on recording that portion of the sequential data in one of the first or second blockchains.

6. The system as recited in claim 1, further comprising:

sending, by the first computing node, one or more communications to the one or more second computing nodes to determine a consensus for the block for the first blockchain while the first computing node is executing the second thread to generate the block for the second blockchain; and recording the block for the first blockchain to the first blockchain upon determining the consensus.

7. The system as recited in claim 1, wherein a leader computing node of the computing nodes applies a timestamp to each received piece of sequential data indicating a time at which the leader node received the piece of sequential data, wherein the received sequential data is stored in the blockchains in sequence according to the timestamps applied by the leader computing node rather than the source local times, the operations further comprising:

receiving, from another computing device, a request to access the first blockchain and the second blockchain;

sending, to the other computing device, a plurality of blocks of the first blockchain and the second blockchain, wherein the other computing device is configured to serialize the sequential data stored in the first blockchain and the second blockchain into a block list for listing the sequential data in a sequential order by:

reading the plurality of blocks of the first blockchain and the second blockchain; and determining where to insert the sequential data into the block list based at least partially on the indicator in the block generated for the second blockchain indicating the block in the first blockchain.

8. The system as recited in claim 1, wherein, during executing the first thread to generate the block for the first blockchain, the first computing device checks that processor usage is below a threshold level before executing the second thread to generate the block for the second blockchain.

9. A method comprising:

receiving, by one or more processors of a first computing node able to communicate with one or more second computing nodes for participating in a consensus system, a plurality of pieces of sequential data from a plurality of different data sources;

generating, by the one or more processors, a block for a first blockchain, the block for the first blockchain including a first sequence of a plurality of the pieces of sequential data;

storing, by the one or more processors, as a most-recent last piece, in a memory location of the first computing node that is separate from the first blockchain, at least a source identifier (ID) of a first source computing device and a source local time provided by the first source computing device that generated a last piece of sequential data of the first sequence, the last piece of sequential data included as the last piece of the first sequence entered in the block for the first blockchain;

checking, by the one or more processors, the at least the source ID of the first source computing device and the source local time provided by the first source computing device and stored in the memory location of the first computing node for determining whether the data source of the last piece of sequential data entered in the block for the first blockchain matches the data source of a next piece of the sequential data;

based at least partially on determining that the data source of the last piece of sequential data in the first sequence entered in the block for the first blockchain is different from the data source of the next piece of the sequential data, generating, by the one or more processors, a block for a second blockchain, the block for the second blockchain including a second sequence of the sequential data that includes the next piece of the sequential data, and associating an indicator with the block generated for the second blockchain that indicates the block in the first blockchain, wherein associating the indicator includes duplicating at least a portion of the last piece of sequential data from the first sequence stored in the block for the first blockchain and storing the duplicated at least the portion of the last piece of sequential data as a first entry in the second sequence of the sequential data in the block for the second blockchain; and replacing, by the one or more processors, the at least the source ID of the first source computing device and the source local time provided by the first source computing device, as an updated most-recent last piece, in the memory location of the first computing node, with at least the source ID of a second source computing device and the source local time provided by the second source computing device that generated a last piece of sequential data of the second sequence, the last piece of sequential data of the second sequence included as the last piece of the second sequence entered in the block for the second blockchain, wherein the memory location is also separate from the second blockchain.

10. The method as recited in claim 9, wherein duplicating at least the portion of the last piece of sequential data entered in the block for the first blockchain as a first entry in the block generated for the second blockchain comprises duplicating at least the source ID of the data source of the last piece of sequential data and the source local time associated with the last piece of sequential data by the data source of the last piece of sequential data, wherein the source local time corresponds to a time at which a respective piece of sequential data is sent by a respective source computing device.

11. The method as recited in claim 9, wherein associating the indicator with the block generated for the second blockchain further comprises including an identifier of the block for the first blockchain in the block generated for the second blockchain.

12. The method as recited in claim 9, further comprising:
determining whether the source ID of the data source associated with the last piece of sequential data entered in the block for the second blockchain matches the source ID associated with a first piece of sequential data to be entered into a next block for the first blockchain; and based at least partially on determining that the data source of the last piece of sequential data entered in the block for the second blockchain matches the data source of the first piece of sequential data to be entered into the next block for the first blockchain, using the first piece of sequential data as a first entry in the next block generated for the first blockchain, wherein the first piece of sequential data immediately follows in sequence the last piece of sequential data entered in the block for the second blockchain.

13. The method as recited in claim 9, further comprising:
executing, by the one or more processors, a first thread to generate the block for the first blockchain;
executing, by the one or more processors, a second thread to generate the block for the second blockchain;
sending, by the one or more processors, while the one or more processors are executing the second thread to generate the block for the second blockchain, one or more communications to the one or more second computing nodes to determine a consensus for the block for the first blockchain; and
recording, by the one or more processors, the block for the first blockchain to the first blockchain upon determining the consensus.

14. The method as recited in claim 9, further comprising:
receiving, by at least one of the first computing node or the one or more second computing nodes, from another computing device, a request to access the first blockchain and the second blockchain;
sending, to the other computing device, a plurality of blocks of the first blockchain and the second blockchain, wherein the other computing device is configured to serialize the sequential data stored in the first blockchain and the second blockchain into a block list for listing the sequential data in a sequential order by:
reading the plurality of blocks of the first blockchain and the second blockchain; and
determining where to insert the sequential data into the block list based at least partially on the indicator in the block generated for the second blockchain indicating the block in the first blockchain.

15. One or more non-transitory computer-readable media storing instructions which, when executed by one or more processors of a first computing node able to communicate with one or more second computing nodes for participating in a consensus system, configure the one or more processors to:
receive a plurality of pieces of sequential data from a plurality of different data sources;
execute a first thread to generate a first block for a first blockchain, the first block including a first sequence of a first plurality of the pieces of sequential data;
store, as a most-recent last piece, in a memory location of the first computing node that is separate from the first blockchain, at least a source identifier (ID) of a first source computing device and a source local time provided by the first source computing device that generated a last piece of sequential data of the first sequence, the last piece of sequential data included as the last piece of the first sequence entered in the block for the first blockchain;
execute a second thread to generate a second block for a second blockchain, the second block including a second sequence of a second plurality of the pieces of the sequential data that sequentially follow the first plurality;

send, while the one or more processors are executing the second thread to generate the second block for the second blockchain, one or more communications to the one or more second computing nodes to determine a consensus for the first block for the first blockchain;

checking the at least the source ID of the first source computing device and the source local time provided by the first source computing device and stored in the memory location of the first computing node for determining whether the source ID associated with the last piece of sequential data in the first sequence entered in the first block for the first blockchain matches the source ID associated with a first piece of sequential data to be entered into the second block for the second blockchain;

based on determining that the source ID of the last piece of sequential data entered in the first sequence in the first block for the first blockchain is different from the source ID associated with the first piece of sequential data in the second sequence to be entered into the second block for the second blockchain, associate an indicator with the second block generated for the second blockchain, the indicator indicating the first block for the first blockchain, by duplicating at least a portion of the last piece of sequential data from the first sequence and storing the duplicated at least the portion of the last piece of sequential data as a first entry in the second sequence entered in the block generated for the second blockchain; and replace, the at least the source ID of the first source computing device and the source local time provided by the first source computing device, as an updated most-recent last piece, in the memory location of the first computing node with at least the source ID of a second source computing device and the source local time provided by the second source computing device that generated a last piece of sequential data of the second sequence, the last piece of sequential data of the second sequence included as the last piece of the second sequence entered in the block for the second blockchain, wherein the memory location is also separate from the second blockchain.

16. The one or more non-transitory computer-readable media as recited in claim 15, wherein the processors are further configured to associate the indicator with the second block generated for the second blockchain by including, in the second block generated for the second blockchain, an identifier of a first blockchain and a block height of the first block for the first blockchain.

17. The one or more non-transitory computer-readable media as recited in claim 15, wherein the processors are further configured to:

execute a third thread to generate a third block for a third blockchain, the third block including a third plurality of the pieces of the sequential data that sequentially follow the second plurality; and send, while the one or more processors are executing the third thread to generate the third block for the third blockchain, one or more communications to the one or more second computing nodes to determine a consensus for at least one of the first block for the first blockchain and the second block for the second blockchain.

* * * * *